(12) United States Patent
Chua et al.

(10) Patent No.: US 10,726,835 B2
(45) Date of Patent: Jul. 28, 2020

(54) VOICE ACTIVATED MODULAR CONTROLLER

(71) Applicant: Amazon Technologies, Inc., Seattle, WA (US)

(72) Inventors: Albert John Yu Sam Chua, San Jose, CA (US); Pushkaraksha Gejji, San Jose, CA (US); Wilfrido Loor Canizares, San Francisco, CA (US); Adam Kenneth Cybart, Morgan Hill, CA (US); Aleksandar Pance, Saratoga, CA (US); Marc Rene Walliser, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 15/389,818

(22) Filed: Dec. 23, 2016

(65) Prior Publication Data

US 2018/0182387 A1   Jun. 28, 2018

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/167* (2013.01); *G10L 15/08* (2013.01); *G10L 15/30* (2013.01);
(Continued)

(58) Field of Classification Search
None
See application file for complete search history.

(56) References Cited

U.S. PATENT DOCUMENTS

| 5,914,826 A | 6/1999 | Ardinger, Jr. |
| 6,404,569 B1 | 6/2002 | Bachschmid et al. |

(Continued)

FOREIGN PATENT DOCUMENTS

| DE | 20014760 | 12/2000 |
| EP | 2801973 | 11/2014 |

OTHER PUBLICATIONS

"Wink", retrieved on Dec. 9, 2016 at <<http://www.wink.com/products/>>, 22 pages.

(Continued)

*Primary Examiner* — Thuykhanh Le
(74) *Attorney, Agent, or Firm* — Lee & Hayes, P.C.

(57) ABSTRACT

A modular controller may be mounted in an opening, such as a standard single wide or double wide electrical junction box, in a wall or other surface. The modular controller may include a power module and a front module. The power module may be mounted in the opening of the surface, and may be configured to provide electrical power to the front module. The front module may be detachably coupleable to the power module. The front module may be configured to receive audio commands, gesture commands, and/or presence input corresponding to a desired action, and may cause the action to be performed by a device of the front module and/or an external device. The front module may include various devices (e.g., components) capable of providing various functionalities, and may be selected for coupling to a power module in a particular location based at least in part on the functionalities.

24 Claims, 10 Drawing Sheets

(51) Int. Cl.
*G06F 3/16* (2006.01)
*G10L 15/08* (2006.01)
*G10L 25/51* (2013.01)
*H04R 1/40* (2006.01)
*H04R 1/02* (2006.01)

(52) U.S. Cl.
CPC .............. *G10L 25/51* (2013.01); *H04R 1/028* (2013.01); *H04R 1/406* (2013.01); *G10L 2015/088* (2013.01); *G10L 2015/223* (2013.01); *H01H 2300/03* (2013.01); *H04R 2201/021* (2013.01); *H04R 2201/401* (2013.01); *H04R 2201/403* (2013.01); *H04R 2420/07* (2013.01); *Y02B 90/224* (2013.01); *Y04S 20/14* (2013.01)

(56) References Cited

U.S. PATENT DOCUMENTS

| | | | | |
|---|---|---|---|---|
| 6,533,225 | B1* | 3/2003 | Berges | H02G 3/18 220/241 |
| 7,620,549 | B2* | 11/2009 | Di Cristo | G06F 40/232 704/257 |
| 8,694,306 | B1* | 4/2014 | Short | G10L 21/0272 704/200 |
| 2007/0156857 | A1* | 7/2007 | King | H04L 41/0806 709/220 |
| 2008/0011501 | A1 | 1/2008 | Gates et al. | |
| 2008/0201138 | A1* | 8/2008 | Visser | G10L 21/0208 704/227 |
| 2008/0258679 | A1* | 10/2008 | Manico | H02J 50/10 320/106 |
| 2009/0092236 | A1* | 4/2009 | Wilson | G08B 25/06 379/93.17 |
| 2011/0080046 | A1* | 4/2011 | Lee | G06F 1/26 307/39 |
| 2011/0095901 | A1* | 4/2011 | Marcinek | H05K 7/1432 340/815.4 |
| 2011/0221671 | A1* | 9/2011 | King, III | G06F 3/017 345/156 |
| 2012/0224714 | A1 | 9/2012 | Couse et al. | |
| 2013/0024196 | A1* | 1/2013 | Ganong, III | G10L 17/00 704/246 |
| 2013/0058022 | A1* | 3/2013 | Knutson | G06F 1/1632 361/679.01 |
| 2013/0060571 | A1* | 3/2013 | Soemo | G10L 15/30 704/251 |
| 2013/0226593 | A1* | 8/2013 | Magnusson | G11B 27/038 704/276 |
| 2014/0002236 | A1* | 1/2014 | Pineau | G06F 21/32 340/5.6 |
| 2014/0006026 | A1* | 1/2014 | Lamb | G10L 17/00 704/246 |
| 2014/0022390 | A1 | 1/2014 | Blank et al. | |
| 2014/0136195 | A1* | 5/2014 | Abdossalami | H04M 3/2236 704/235 |
| 2014/0163978 | A1* | 6/2014 | Basye | G10L 15/28 704/233 |
| 2014/0195826 | A1* | 7/2014 | Wojcik | G06F 21/86 713/300 |
| 2014/0219472 | A1* | 8/2014 | Huang | H04R 1/406 381/92 |
| 2014/0246339 | A1 | 9/2014 | Chung et al. | |
| 2014/0278435 | A1* | 9/2014 | Ganong, III | G10L 15/22 704/275 |
| 2015/0142450 | A1* | 5/2015 | Liang | G10H 1/125 704/500 |
| 2015/0154976 | A1* | 6/2015 | Mutagi | H04L 12/281 704/275 |
| 2015/0194152 | A1* | 7/2015 | Katuri | G10L 15/30 704/231 |
| 2015/0221307 | A1* | 8/2015 | Shah | G10L 15/28 704/253 |
| 2015/0271900 | A1* | 9/2015 | Wright | G05B 15/02 315/291 |
| 2015/0279387 | A1* | 10/2015 | List | H04R 3/005 704/226 |
| 2015/0287422 | A1* | 10/2015 | Short | G10L 13/02 704/205 |
| 2016/0071508 | A1* | 3/2016 | Wurm | G10K 11/1784 381/58 |
| 2016/0111091 | A1* | 4/2016 | Bakish | G10L 15/30 704/275 |
| 2016/0111109 | A1* | 4/2016 | Tsujikawa | B60R 11/0247 704/226 |
| 2016/0140986 | A1* | 5/2016 | Bowers | A61B 5/163 704/271 |
| 2016/0171979 | A1* | 6/2016 | Breazeal | B25J 11/0015 704/9 |
| 2016/0309246 | A1* | 10/2016 | O'Keeffe | H04W 4/70 |
| 2016/0372973 | A1* | 12/2016 | Fitzgerald | H02J 7/0042 |
| 2017/0060214 | A1* | 3/2017 | Yang | G06F 1/28 |
| 2017/0070822 | A1* | 3/2017 | Skovenborg | H04R 3/005 |
| 2017/0116483 | A1* | 4/2017 | Richardson | G06K 9/00771 |
| 2017/0181249 | A1* | 6/2017 | Takahashi | H05B 37/0227 |
| 2017/0297430 | A1 | 10/2017 | Hori et al. | |
| 2018/0020314 | A1* | 1/2018 | Sheen | H04S 7/308 |
| 2018/0075786 | A1* | 3/2018 | Thul | G09F 9/3026 |

OTHER PUBLICATIONS

PCT Invitation to Pay Additional Fees dated Apr. 19, 2018 for PCT Application No. PCT/US17/67274, 13 pages.
PCT Search Report and Written Opinion dated Jun. 20, 2018 for PCT Application No. PCT/US17/67274, 20 pages.
Non Final Office Action dated Feb. 7, 2019 for U.S. Appl. No. 15/983,927 "Voice Activated Modular Controller" Chua, 25 pages.
Office Action for U.S. Appl. No. 15/983,927, dated Aug. 7, 2019, Chua, "Voice Activated Modular Controller", 30 pages.
Non Final Office Action dated Nov. 12, 2019 for U.S. Appl. No. 15/983,927 "Voice Activated Modular Controller" Yu Sam Chua, 32 pages.

* cited by examiner

VOICE ACTIVATED MODULAR CONTROLLER

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
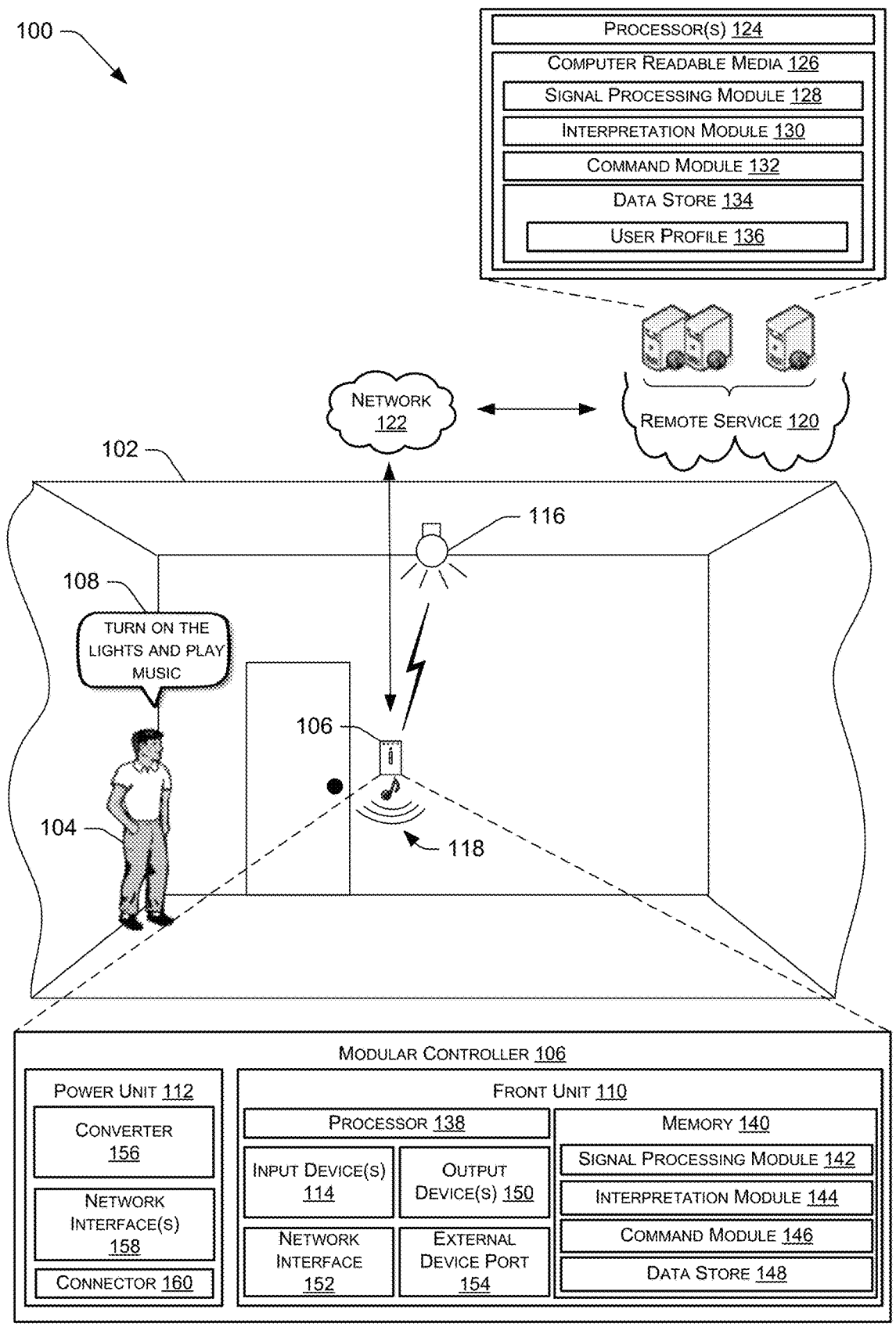
FIG. 1 shows an example interactive device computing architecture set in a home environment. The architecture includes at least one modular controller physically situated in the home.

This disclosure describes, in part, techniques and devices for providing centralized environmental and/or entertainment control with an interactive modular controller. Environmental control may include control of lights (e.g., on, off, dim, etc.), temperature (e.g., air conditioning, heating, fan control, etc.), alarm systems, doors, windows, window shades, and/or various other environmental systems. Entertainment control may include control of visual displays, audio presentations, two-way communications, and the like. The modular controller includes a power unit and a front unit. The power unit may be configured to mount onto a surface in an environment. The power unit may be sized to fit in a standard electrical junction box. Multiple different front units may be configured to interchangeably couple to a standardized power unit. For example, the power unit may be mounted into a wall so that a front side of the power unit is substantially aligned with (i.e., flush against) the wall. The environment may include multiple power units. For example, each room in a home environment may include one or more power units. Each power unit may provide electrical power and/or data to a front unit.

The front unit may detachably couple to the power unit in the environment. The front unit may comprise a voice, touch, and/or gesture-controlled device. The front unit may include a computing system that is communicatively coupled (e.g., wired or wireless connection) to internal and/or external devices to affect the environment and/or entertainment control. The internal and/or external devices to which the front unit computing system is communicatively coupled may include mobile and/or stationary computing devices (e.g., a tablet computing device, a mobile phone, a laptop computer, a desktop computer, a set-top box, a wearable device, etc.), appliances (e.g., a television, an audio system, a garage door opener, a washing machine, a dryer, a dishwasher, a coffee maker, a refrigerator, a door, motorized window shades, a telephone, a tablet, etc.), fixtures (e.g., a light, a lock, a sink, a toilet, a door bell, a smoke alarm, a fire alarm, a carbon monoxide detector, etc.), or other types of devices in the environment.

The front unit may include various components and settings based on a location of the front unit in the environment. For example, a front unit located in a foyer of a house may include a display for a presenting a weather forecast for a user to view prior to departing the house, and speakers for greeting the user upon entry into the house. For another example, a front unit located in a living room may include a mechanical switch configured to control one or more lights and/or a display to view thermostat settings. A user may select a front unit for a particular location in the home environment based on the functionalities of the front unit.

The user in the environment may issue, to the front unit, a command (e.g., voice, touch, and/or gesture input) including a request for the front unit to cause a second device in the environment to perform an action (e.g., operation). The command may include a request for the front unit to cause a component (e.g., internal device) of the front unit to perform the action, such as "play music." Additionally or alternatively, the command may include a request for the front unit to cause an external device to perform the action, such as "turn on the lights."

The front unit may include a microphone array configured to receive a voice command, a touch command, and/or one or more sensors configured to receive a gesture command (e.g., a movement of a body part corresponding to a request for the front unit to cause an action to be performed) and/or a touch command (e.g., physical touch via an input device corresponding to a request for the front unit to cause an action to be performed). The respective component of the front unit may receive the command and send, over a network, a signal corresponding to the command to a computing system, which in some cases may include a main logic board housing a system on a chip. The computing system may be a local computing system (e.g., internal to the front unit and/or power unit of the modular controller) and/or a remote computing system (e.g., a computing device external to the modular controller). The computing system may perform speech and/or gesture recognition on the signal to identify the command. The computing system may then interpret (e.g., determine a meaning) the command, and a device corresponding thereto. For instance, if the command is a request to "turn on the lights," the computing system may identify the location of the front unit and one or more lights corresponding to the location. The computing system may then generate a control signal including an instruction for a controller of the identified device to perform an action, the control signal including an identification and/or location of the identified device. The computing system may then send the control signal to the controller over the network. In examples in which the computing system includes a remote service, the computing system may send the control signal to the controller via the front unit.

Furthermore, while the above examples describe a user requesting an action to be performed, in other instances a device may initiate a process for causing an internal and/or external device to perform an action. For example, a front unit may be programmed to cause a device to perform a certain action upon one or more conditions being met, such as a user being detected in an environment, a time of day occurring, or the like. For example, a motion sensor may detect the presence of a user and may initiate a process for causing a light to turn on. For another example, a front unit may be configured to track user activity and/or preferences. The front unit may generate an activity model to anticipate settings for various devices based on the user activity and/or preferences.

The present disclosure provides an overall understanding of the principles of the structure, function, manufacture, and use of the systems and methods disclosed herein. One or more examples of the present disclosure are illustrated in the accompanying drawings. While the techniques and devices presented herein are described with respect to the home environment, those of ordinary skill in the art will understand that the systems and methods specifically described herein and illustrated in the accompanying drawings are non-limiting embodiments and that the techniques and devices described herein may also be used in other environments (e.g., business environments, commercial environments, etc.). The features illustrated or described in connection with one embodiment may be combined with the features of other embodiments, including as between systems and methods. Such modifications and variations are intended to be included within the scope of the appended claims.

FIG. 1 shows an illustrative interaction computing architecture 100 set in a home environment 102 that includes a user 104 and a modular controller 106. The human interaction may include a voice command, a touch command, a gesture command, and/or a physical presence in the home environment 102.

As illustrated, a user 104 in the environment 102 may issue a voice command 108 to the modular controller 106. In some examples, the command 108 may additionally or alternatively include a touch and/or gesture command. A front unit 110 of the modular controller 106 may receive the command 108 via one or more input device(s) 114. The input device(s) 114 may include one or more microphones to detect audio signals, one or more sensors to detect a touch, a gesture, and/or physical presence of the user, a keyboard, keypad, mouse, joystick, control buttons, touch screen display, etc. The input device(s) 114 may generate one or more signals for identifying the command 108 and causing the corresponding action to be performed, such as causing a light 116 to be turned on and/or music 118 to be played.

The input device(s) 114 may send the signals corresponding to the command 108 to a computing system for processing. In some examples, the input device(s) may send the signals to a remote computing system, such as a remote service 120, either directly or via a local computing system. In such examples, the input device(s) and/or the local computing system may cause the remote service 120 to perform one or more speech processing operations based on the signal.

The remote service 120 may include one or more remote devices (or "computing resources"). The remote devices may form a portion of a network-accessible computing platform implemented as a computing infrastructure of processors, storage, software, data access, etc. that is maintained and accessible via a network 122, such as the Internet. The remote devices do not require end-user knowledge of physical location and configuration of the system that delivers the services. Common expressions associated for these remote devices include "on-demand computing," "software as a service (SaaS)," "platform computing," "network-accessible platform," "cloud services," "data centers," and so forth. Further, while FIG. 1 illustrates the remote service 120 as being accessible over a network, in other examples, the remote service 120 may comprise a local hub within the home environment 102.

As illustrated, the remote service 120 includes one or more processor(s) 124 and computer-readable media 126, which have access to a signal processing module 128, an interpretation module 130, a command module 132, and a data store 134. The processor(s) 124 may include a central processing unit (CPU), a graphics processing unit (GPU), both CPU and GPU, a microprocessor, a digital signal processor or other processing units or components known in the art. Alternatively, or in addition, the functionally described herein may be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 124 may possess its own local memory, which also may store program modules, program data, and/or one or more operating systems.

The computer-readable media 126 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 126 may be implemented as computer-readable storage media ("CRSM"), which may be any available physical media accessible by the processor(s) to execute instructions stored on the computer-readable media. In various examples, CRSM may include random access memory ("RAM") and Flash memory. In some examples, CRSM may include, but is not limited to, read-only memory ("ROM"), electrically erasable programmable read-only memory ("EEPROM"), or any other tangible medium which can be used to store the desired information and which can be accessed by the processor(s) 124.

Several functional modules, data stores, and so forth may be stored within the computer-readable media 126 and configured to execute on the processor(s) 124. A few example functional modules (e.g., signal processing module 128, interpretation module 130, and command module 132) are shown as applications stored in the memory and executed on the processor(s) 124, although the same functionality may alternatively be implemented in hardware, firmware, or as a system on a chip (SOC). Additionally, though illustrated as signal processing module 128, interpretation module 130, and command module 132, the functionality of the modules may be performed by a greater or lesser number of modules.

In various examples, the front unit 110 of the modular controller 106 may send signals corresponding to the command 108 (e.g., voice, touch, gesture and/or presence command) to the remote service 120 for speech processing (e.g., automatic speech recognition (ASR), natural language understanding (NLU), query parsing, etc.) to identify the command. The remote service 120 may receive the signals at the signal processing module 128. In various examples, the signal processing module 128 may perform object and/or speech recognition processing techniques to generate a processed signal. For example, the signal processing module 128 may receive a signal related to a gesture command, and may perform scale-invariant feature transform, speeded up robust features, greyscale matching, gradient matching, facial recognition, or other techniques to identify a gesture and/or a user associated with the signal. For another example, the signal processing module 128 may receive an audio signal and may perform beamforming, acoustic-echo cancelation, background noise reduction, or other techniques to generate one or more processed audio signals having a higher signal-to-noise ratio than the pre-processed audio signals.

The remote service 120 may route the signals (e.g., touch, gesture, presence, audio, etc.) to the interpretation module 130 configured to interpret the command associated therewith. In various examples, the interpretation module 130 may perform ASR on audio data to determine text. In such examples, the interpretation module 130 may process the text to determine multiple portions thereof. For example, a first portion of the text may correspond to a command and a second portion of the text may correspond to a conditional statement that may relate to when the command should be executed. In such examples, the interpretation module 130 or other module of the remote service 120 may be configured to determine if the condition is met. For another example, a first portion of the text may correspond to a first command and a second portion may correspond to a second command. Additionally or alternatively, the interpretation module 130 may perform NLU on input data to determine a meaning of the data (e.g., a meaning of the command). In some examples, NLU may be performed on the text determined as a result of the ASR processing. NLU processing interprets a text string to derive an intent or a desired action from the user as well as the pertinent pieces of information in the text that allow a device to complete the desired action. In various examples, the interpretation module 130 may compare words in the signals to words, phrases, touch selections, gestures, and/or presence settings in the data store 134. In some examples, one or more of the words, phrases, touch selections, gestures, and/or presence settings may be user-specific and stored in a user profile 136. In the illustrative example, the interpretation module 130 may receive a processed signal corresponding to the voice command 108, and may determine that the processed signal includes a first command to turn on the light 116 and a second command to play music 118.

The output data from the interpretation module 130 may then be sent to the command module 132 for command processing. The command module 132 may determine a device associated with the commands, and may generate an instruction (e.g., a control signal) to perform a corresponding action (e.g., operation). The instruction may include information about the action and/or information about the device identified to perform the action. The remote service 120 may then send the instruction to the associated device directly and/or via the front unit 110. In the illustrative example, the remote service 120 sends instructions to the front unit 110 to play music 118 and turn on the light 116, such as by activating a light switch on the front unit 110. In some examples, the instructions may include a command to send the control signal to a device, such as the light 116, to perform the corresponding action ("turn on").

The front unit 110 may communicate with the remote service 120 and/or one or more devices over one or more network(s) 122, which may comprise wired technologies (e.g., wires, USB, fiber optic cable, etc.), wireless technologies (e.g., WiFi, RF, cellular, satellite, etc.), or other connection technologies. The network(s) 122 may represent of any type of communication network, including data and/or voice network, and may be implemented using wired infrastructure (e.g., cable, CAT5, fiber optic cable, etc.), a wireless infrastructure (e.g., RF, cellular, microwave, satellite, etc.), and/or other connection technologies. In some examples, the front unit 110 may also communicate with devices via short-range wireless communication protocols (e.g., Bluetooth®, Zigbee®, etc.). For example, the front unit 110 may send a control signal to the light 116 via a Bluetooth® connection.

In some examples, the input device(s) 114 may receive the command, and may send the signals to a local computing system for processing. The local computing system of the front unit 110 may include one or more processor(s) 138 and computer-readable media 140. The processor(s) 138 may include a central processing unit (CPU), a graphics processing unit (GPU), both CPU and GPU, a microprocessor, a digital signal processor or other processing units or components known in the art. Alternatively, or in addition, the functionally described herein may be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 138 may possess its own local memory, which also may store program modules, program data, and/or one or more operating systems.

The computer-readable media 140, similar to computer-readable media 126 described above, may include any tangible medium used to store the desired information and which can be accessed by the processor(s) 138. Several modules such as instruction, data stores, and so forth may be stored within the computer-readable media 140 and configured to execute on the processor(s) 138. A few example functional modules are shown as applications stored in the computer-readable media 140 and executed on the processor(s) 138, although the same functionality may alternatively be implemented in hardware, firmware, or as a system on a chip (SOC). For example, the computer-readable media 140 may include a signal processing module 142. In some examples, the signal processing module 142 may be configured to employ any number of conventional speech processing techniques such as automatic speech recognition, natural language understanding, and extensive lexicons to interpret voice input, such as signal processing module 128. In other examples, the signal processing module 142 may simply be programmed to identify the user uttering a predefined word or phrase (e.g., a "wake word"), a making a predefined touch input, or making a predefined gesture, after which the front unit 110 may begin uploading audio signals to the remote service 120 for more robust processing. In such examples, the signal processing module 142 may compare words detected by a microphone to the wake word and responsive to a match, may determine that words detected thereafter comprise a command. Additionally, the front unit 110 may include an interpretation module 144, a command module 146, and/or a data store 148, to process a signal, interpret the contents of the signal, and generate a command associated with the signal, in lieu of, or in addition to, the remote service 120 described above.

In various examples, the front unit 110 may include one or more output device(s) 150 configured to perform requested actions. The output devices(s) 150 may include a speaker, a display, a wireless transceiver configured to transmit a signal to an external device (e.g., an external speaker, display, computing device, audio/visual system, a second front unit, etc.), a vibrator to create haptic sensations, and the like. The output device(s) 150 may include device controllers configured to receive control signals. Responsive to receiving a control signal from the local computing system and/or the remote service 120, the output device(s) 150 may perform the requested action. In the illustrative example, responsive to receiving a control signal associated with the command 108 to "play music," the speakers on the front unit 110 may play the requested music 118.

In some examples, the front unit 110 may include one or more network interface(s) 152 to facilitate network communications with external devices. In some examples, the network interface(s) 152 may be coupled to an antenna to facilitate wireless communication to the network(s) 122. The network interface(s) 152 may implement one or more various wireless technologies, such as Wi-Fi, Bluetooth®, RF, and so on. Additionally, the front unit 110 may include an external device port 154, such as a USB port, to connect external devices directly to the front unit 110. The external device port 154 may facilitate power and/or data transfer between the front unit 110 and the external device. The external device may couple to the external device port 154 and/or the front unit 110 via a USB connector, a pogo pin, a mechanical attachment (e.g., a snap-fit connector, a magnetic connector, etc.), or other type of coupling mechanism.

In various examples, the front unit 110 may receive electrical power from and/or transfer data to/from the power unit 112. The power unit 112 may be mounted in a wall, such as in the wall of environment. In some examples, the power unit 112 may be inset into the wall such that a back side of a face plate is substantially flush against (e.g., aligned with) a surface of the wall. In various examples, the power unit 112 may be sized to fit into a standard electrical junction box. The power unit 112 may include a power converter 156 configured to provide an appropriate power format (e.g., voltage, current, etc.). Additionally, in some examples, the power unit 112 may be configured to provide a means for data transfer via one or more network interface(s) 158, such as, for example, via a power-line communication connection. The power unit 112 may provide electrical power and/or data transfer via a connector 160.

Figure 2:
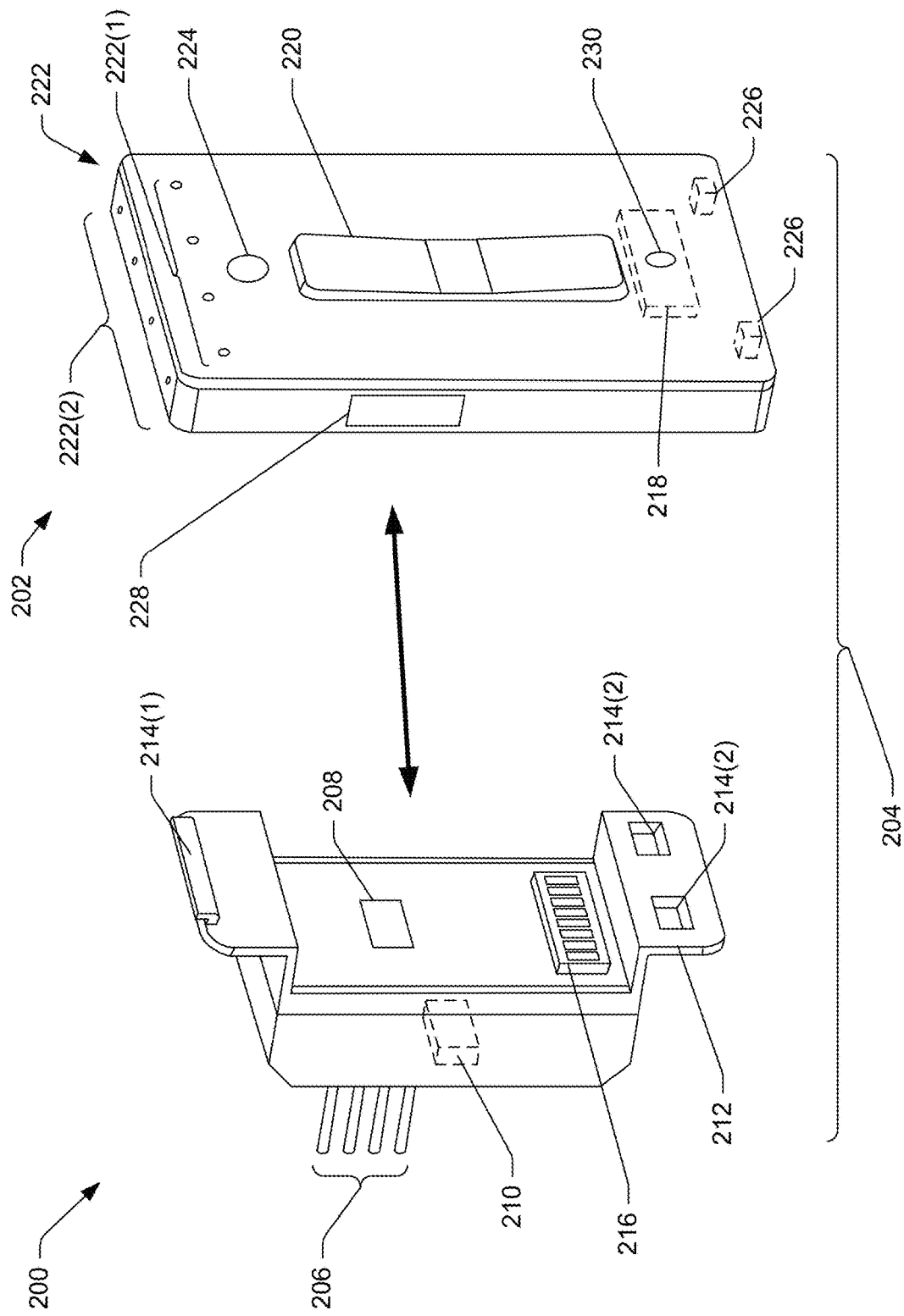
FIG. 2 illustrates a perspective view of an example front unit and an example power unit of a modular controller.

FIG. 2 illustrates a perspective view of an example power unit 200, such as power unit 112, and an example front unit 202, such as front unit 110, of a modular controller 204, such as modular controller 106. As discussed above, the power unit 200 may be configured to receive power, such as via one or more wires 206, convert the electrical power to a format compatible with the front unit 202 (e.g., AC to DC conversion, such as 110V to 9V conversion, 220V to 9V conversion, etc.), and transmit power to the front unit 202.

In various examples, the power unit 200 may comprise a form factor configured to fit in a standard electrical junction box. In such examples, the power unit 200 may comprise a height, width, and/or depth to house within a junction box. In various examples, the power unit 200 may be sized to fit within a single gang, double gang, or multiple gang junction box. In some examples, two or more power units 200 may fit in a double gang or multiple gang junction box.

The power unit 200 may be configured to couple to one or more wires 206 for receiving power (e.g., connect to a power source) via a terminal. In various examples, the wires 206 may include one or more electrical wires (e.g., hot, ground, load, neutral). In some examples, the wires 206 may also be used to transmit data (e.g., in the case of power line communication or PLC). In some examples, the wires 206 may additionally or alternatively include network communication wires (e.g., Ethernet cable, or other network cable). The power unit may include a relay for on/off functionality. In some examples, the power unit 200 may include a disconnect switch 208 (e.g., a kill switch) to shut off electricity and/or a network connectivity coming into to the power unit. In such examples, the electrical and/or data connection, such as via the wires 206 may be disconnected. In various examples, a user may access the disconnect switch 208 by removing the front unit and activating the disconnect switch 208 (e.g., pressing a button, moving a toggle switch, etc.).

Additionally, the power unit 200 may be configured to dissipate heat generated from the electrical connections, data connections, and/or other functions of the power unit. In various examples, the power unit 200 may include a thermal material on one or more sides. In such examples, the thermal material may act as a heat sink to dissipate heat. The thermal material may comprise a thermally conductive material such as metal (e.g., an aluminum alloy, copper, etc.), a composite material, a ceramic material, and/or a combination thereof.

In various examples, the power unit may include a dimmer 210 (e.g., a triode for alternating current, a gate turn-off thyristor, etc.). The dimmer 210 may be configured to receive a signal including a command to adjust a brightness of one or more lights, such as light 110 in home environment 102. The dimmer 210 may then convert the signal into an appropriate voltage output to increase or decrease the intensity of the one or more lights (e.g., dim or make brighter). In various examples, the dimmer 210 may then send the appropriate voltage output directly to the one or more lights. In some examples, the dimmer 210 may send a signal including an indication of the appropriate voltage output to the one or more lights, and the one or more lights may reduce or increase a voltage accordingly.

In various examples, the power unit 200 may be mounted in a wall, such as in the wall of home environment 102. In such examples, the power unit 200 may be inset into the wall such that a back side of a face plate 212 (e.g., casing) is substantially flush against a surface of the wall. The face plate 212 may comprise a metal material (e.g., zinc, aluminum, steel, etc.), a plastic material, a composite material (e.g., fiberglass, carbon fiber, etc.), and/or a combination thereof.

In various examples, the power unit 200 may be configured to couple to the front unit 202 via a mechanical interlock and/or mechanical connection between the face plate 212 and the front unit. The mechanical interlock and/or mechanical connection may prevent vertical, horizontal, and/or fore/aft movement of the front unit 202 when mechanically coupled to the power unit. To facilitate the mechanical interlock and/or mechanical connection, the face plate 212 and/or the power unit 200 can include connection points 214. In the illustrative example, the connection points 214 include a drop connection point 214(1) and two snap-fit connection points 214(2) for a two-axis drop-and-snap mechanical connection. In such an example, the front unit 202 may be horizontally aligned to the power module and vertically lowered until the connection point 214(1) contacts a corresponding connection point on the front unit 202. When vertically aligned, snap-fit connectors on the front unit 202 may couple to the connection points 214(2) for a secure mechanical connection. In other examples, the connection points 214 can include one or more of drop connectors, magnetic connectors, snap-fit connectors, spring latch connectors, cantilever connectors, hook and loop connectors, sleeve connectors, or the like. For example, the connection points 214 can include four snap-fit connection points. Corresponding snap-fit connectors on the front unit 202 can engage the snap-fit connection points when the front unit 202 and the power unit 200 are substantially aligned. For another example, the connection point 214(1) can include a drop connection point and the connection point 214(2) can include a spring-latch connection point. In such an example, when vertically aligned, a spring-latch connector on the power unit 200 or the front unit 202 can engage and secure the front unit 202 to the power unit 200. For another example, the connection points 214 can be configured to secure a cantilever with protrusion (e.g., a bump). The front unit 202 may be horizontally aligned with the power unit 200, and slid vertically down until the protrusion on the cantilever engages the connection point 214, thereby preventing further vertical movement. In such an example, the front unit 202 may include a sleeve connection point configured to couple with at least part of the face plate 212 or another connection point 214 of the power unit 200.

In some examples, the face plate 212 may couple to a rear cover of the front unit 202. The rear cover may comprise a metal material, a plastic material, a rubber material, a composite material, and/or a combination thereof. In some examples, the rear cover may be configured to act as a heat sink to dissipate heat generated by the front unit and/or the power unit. In some examples, the coupling between the front unit 202 and the power unit 200 may comprise an air gap (e.g., 1 mm, 2 mm, 3 mm spacing, etc.) to thermally isolate the front unit 202 from the power unit 200 to minimize transfer of heat to the front unit 202.

Additionally or alternatively, the power unit 200 may be configured to couple to the front unit 202 via a connector 216, such as connector 162. In various examples, the connector 216 may be an electro-mechanical connector. As illustrated, the connector 216 includes 8 pins for electrical power and/or data transfer to the front unit 202. In other examples, the connector 216 may include a greater or lesser number of pins. The front unit 202 may include a front unit connector 218 configured to align with the connector 216 for electrical power and/or data transfer. The data transfer may include a two-way transfer of data signals between the front unit 202 and the power unit 200. For example, responsive to receiving a voice command to dim a light, the front unit may process the voice command and may send a signal to the dimmer 210 in the power unit 200 to cause the light to dim.

In some examples, the connector 216 and/or the front unit connector 218 may include a floating connector configured to move vertically and/or horizontally to align with the other connector. In such examples, the connectors 216 and 218 may together provide a self-aligning interconnect for electrical power and/or data transfer.

In various examples, the front unit 202 and the power unit 200 may be approximately the same height and/or weight. In other examples, the front unit 202 may be approximately a multiple of the height and/or width of the power unit 200, or vice versa. In some examples, the front unit 202 may comprise a height and/or width to facilitate coupling the modular controller 200 to an off-the-shelf wallplate, such as that illustrated in FIG. 7B.

As discussed above, the front unit 202 may be detachably coupled to the power unit 200, and together the units may comprise the modular controller. In various examples, the power unit 200 may be a universal power unit configured to couple to multiple different front units. In such examples, each power unit 200 in a home may include substantially the same features, and a user may select a different front unit 202 to couple to a particular power unit 200, based on a location associated therewith. For example, a user who enjoys watching the news while making breakfast may mount a front unit 202 with a display configured to present information on a power unit 200 mounted in a kitchen.

In various examples, the modular controller 204 may be communicatively coupled to one or more other modular controllers in the home environment via a wired and/or wireless connection. In such examples, the modular controllers 204 may be used as one or two-way communication devices, such as an intercom system. For example, a user may issue a voice command to a modular controller 204 in the kitchen to activate an intercom functionality with a modular controller in a child's bedroom. The user may then transmit an audio signal to a modular controller in the child's room telling a child to wake up.

As illustrated, a single power unit 200 is configured to couple to a single front unit 202. In other examples, a single power unit 200 may be configured to couple to two or more front units 202. In various examples, two or more power units may be mounted into a wall in close proximity to one another. For example, the two or more power units may be mounted adjacent to one another, with minimal spacing in between the respective front plates (e.g., 0 cm, 1 cm, 2 cm, 5 cm, etc.). In various examples, the two or more power units 200 may be mounted at a distance from one another determined by a width of the front units 202, such that when the front units 202 are mounted on each respective power units, adjacent sides of the front units 202 are substantially flush. In some examples, the two or more power units 200 may include a bracket configured to align the respective front units 202. In such examples, the bracket may align the front units 202 such that the adjacent sides of the may be substantially flush, the adjacent sides may be substantially parallel to the wall, and/or a bottom side may be substantially parallel to a floor surface (e.g., substantially perpendicular to the wall).

In the illustrative example, the front unit 202 includes a mechanical switch 220 (e.g., a rocker switch, a sliding switch, a rotatable switch, etc.). In various examples, the mechanical switch 220 may include a mechanical on/off switch for one or more devices coupled to the modular controller (e.g., wired or wireless coupling). For example, the mechanical switch 220 may be a light switch configured to cause a light to turn on and off. In some examples, a position (e.g., up, down, etc.) of the mechanical switch 220 can determine various functionalities of the front unit 202. For example, when the mechanical switch 220 is in an up position, the front unit 202 may be configured to process voice commands via one or more microphones of the microphone array, and when the mechanical switch 220 is in the down position, the front unit 202 may be configured to process voice commands via one or more other microphones of the microphone array. For another example, when the mechanical switch 220 is in an up position, the front unit 202 may be communicatively coupled to a first set of devices in the environment, and when the mechanical switch 220 is in a down position, the front unit 202 may be communicatively coupled to a second set of devices in the environment. In such an example, the first set of devices and the second set of devices may include some overlapping devices (i.e., devices in both the first set and the second set).

In some examples, the mechanical switch 220 may include an on/off switch for the front unit 202. In such examples, the mechanical switch 220 may cause the electrical power and/or data transfer between the power unit 200 and the front unit 202 to turn on and off. In some examples, a position of the mechanical switch 220 may determine which audio signals to process. In such examples, each of the microphones in the microphone array may generate and send an audio signal to the computing system for processing (e.g., voice recognition, beamforming, noise cancellation, acoustic echo cancelation, etc.). Based on the position of the mechanical switch 220, the computing system can determine which audio signals (i.e., signals from particular microphones) to process. For example, responsive to determining that the mechanical switch 220 is in an up position, the front unit 202 may process audio signals from a first microphone array located on a top half of the front unit 202. Responsive to determining that the mechanical switch 220 is in a down position, the front unit 202 may process audio signals from a second microphone array located on a bottom half of the front unit 202. In various examples, the microphone selection may be based on an alignment of the one or more microphones when the switch is in a particular position.

In various examples, the front unit 202 may include a re-set switch configured to temporarily remove and restore power from the front unit 202, and/or a disconnect switch configured to remove electrical power and/or data from the front unit 202 and/or the power unit 200.

Additionally or alternatively, the front unit 202 may include a display for presenting information. The display can be a light-emitting diode (LED) display, an organic light-emitting diode (OLED) display, an active-matrix OLED display, a liquid crystal (LCD) display, a thin film transistor (TFT) display, a thin film diode (TFD) display, color super twisted nematic (CSTN) display, a quantum dot display, carbon nanotubes, or any other type of display. In various examples, the display may be configured to receive touch input, such as through a capacitive touchscreen or a resistive touchscreen.

The front unit 202 may include one or more antennae configured to transmit and receive signals over a network, such as network 118. The signals may include audio and/or visual data corresponding to commands processed via the computing device. The signals may also include data signals comprising instructions for a device (internal or external to the front unit 202) to perform an operation, such as to turn on a light or play music.

The front unit 202 may include various components to assist in the human interaction functionality, such as one or more microphone arrays 222, and/or one or more sensors 224. In the illustrative example, front unit includes a microphone array 222(1) with four microphones located on a top portion of a front panel and microphone array 222(2) with four microphones located on a top surface of the front unit 202. In other examples, the one or more microphone arrays 222 may include a greater or lesser number of microphones in a similar pattern (e.g., two rows of microphones, three rows of microphones, etc.) and/or different pattern (e.g., microphones situated in a circular pattern on a surface, offset and/or alternating rows of microphones, etc.). In various examples, the one or more microphone arrays 222 may be on different planar surfaces of the front unit 202, such as a side (e.g., substantially vertical) surface, a bottom (e.g., substantially horizontal) surface, a bottom portion of the front panel, a middle portion of the front panel, a beveled or rounded corner of the front unit 202, etc. In some examples, such as the one shown in FIG. 2, the different planar surfaces may be substantially perpendicular to one another.

In the illustrative example, the microphones of the microphone arrays 222(1) and 222(2) are arranged in linear arrays. In some examples, the microphones of each microphone array 222 may be arranged in two or more linear arrays. In such examples, the microphones may be spaced substantially evenly along a length of the array. In various examples, one or more microphones of the microphone arrays 222 may be spread across a surface of the front panel, and/or other surface of the front unit 202 (e.g., on the mechanical switch 220). For example, a microphone array 222 may include a first microphone at a top center location of the front panel, a second microphone at a bottom center location of the front panel, and a third microphone centered on a mechanical switch 220. For another example, a microphone array 222 may include a plurality of microphones situated in a circular pattern on the front panel. For yet another example, a microphone array 222 may include a plurality of microphones randomly (e.g., inconsistent spacing and/or pattern) spread across a front panel and/or other surface of the front unit 202. A location and number of microphones of the microphone array 222 may be selected based on a particular location (e.g., a height above a flat surface, such as the floor, counter, etc.) of the power unit 200 to which the front unit 202 will be coupled, and/or acoustic considerations in the environment.

In various examples, the microphone array 222 may be inset into the front unit 202. In such examples, a front panel of the front unit 202 may include an opening for audio waves to travel to the inset microphone array 222. The opening may be covered with an acoustic transparent material (e.g., fabric, foam, etc.). In some examples, the front unit 202 may include a dome feature or other three-dimensional feature protruding from a surface (front, top, bottom, side, beveled surface, etc.). In such examples, the protruding feature may be configured to house at least part of the microphone array 222. As discussed in further detail below with regard to FIGS. 8A and 8B, the microphone array 222 may include an expandable array. The expandable array may include at least one adjustable microphone. The adjustable microphone may be configured to slide, swing, or otherwise move from a first (e.g., stored) position into a second (e.g., expanded) position.

As discussed above, the microphone array 222 may be configured to receive voice commands, such as voice command 108, from a user. In various examples, the microphone array 222 may be configured to recognize one or more keywords (e.g., a wake word, wake phrase) from the user. In such examples, the microphone array 222 may filter out noises detected that are not preceded by the one or more keywords. The one or more keywords may be predefined. In some examples, the one or more keywords may be user specific. In such examples, the predefined keywords may be stored in a user profile on a data store in the front unit 202. In some examples, the microphone array 222 may be configured to recognize a verb spoken in the imperative mood (e.g., a command tense). In such examples, the microphone array 222 may filter out noises detected that are not preceded by a verb in the imperative mood. In some examples, the verbs may be predefined, based on capabilities of the modular controller and/or secondary devices in communicatively coupled to the modular controller.

The microphone array 222 may receive the voice commands, and may generate an audio signal corresponding to the command. As discussed above, the microphone array 222 may send the audio signal to a local and/or remote computing device (e.g., remote service via a network) to process the signal and interpret the voice command (e.g., one or more actions to be performed) associated therewith. The local and/or remote computing device may generate and send instructions to one or more devices to perform the corresponding action(s). In various examples, the instructions may be sent to the one or more devices via the front unit 202. In some examples, the instructions may be sent directly to the one or more devices.

In various examples, the voice command may include a query (e.g., a request for information). In such examples, the instructions may include a first instruction comprising the query a search engine (e.g., one or more remote devices). In response to receiving the response to the query from the search engine, the local and/or remote computing device may send a second instruction comprising a presentation of the desired information. For example, the voice command may include a request for a weather forecast. The local and/or remote computing devices would process the signal and send the first set of instructions to a search engine. Responsive to receiving the results from the search engine, the local and/or remote computing device sends a second instruction to present the weather data to the user. The presentation may be an audio, visual and/or haptic presentation on the front unit 202 and/or an audio, visual, and/or presentation on a secondary device, such as a television located proximate to (e.g., in a same room) the modular controller in the home environment.

In various examples, the front unit 202 may include one or more sensors 224 to detect (e.g., identify) a gesture and/or a presence of the user. The one or more sensors 224 may include a visual sensor (e.g., a camera, etc.), a motion sensor (e.g., passive infrared (PIR) sensor, etc.), a thermal sensor (e.g., forward looking infrared (FLIR) sensor, etc.), an air sensor (e.g., $CO_2$ detector, etc.), and/or other sensors to detect visual input (e.g., gestures, presence, etc.). In some examples, the one or more sensors 224 may include multiple of any of the foregoing sensors or other sensors. In various examples, the front unit 202 may be programmed to cause one or more devices to perform one or more actions based on a physical presence in a room in which the modular controller is located. In such examples, the one or more sensors 224 may detect the physical presence, and may send a signal corresponding to the presence to a local and/or remote computing device to cause the one or more actions to be performed. In some examples, the computing system of the front unit 202 may be configured to automatically (e.g., without processing the presence signal to determine an interpretation of a command) cause the one or more actions to be performed based on detection of the physical presence. For example, the front unit 202 located in a hospital waiting room may be programmed to automatically turn on a light and play music when people are in the waiting room. Based on a detection of a person in the waiting room, the front unit 202 may automatically cause a light to turn on and may cause a speaker to play music.

In various examples, the one or more sensors 224 may be configured to identify one or more gestures (e.g., predefined gestures) associated with one or more commands. The one or more sensors 224 may capture one or more images of a user in the environment. In some examples, the user must be within a predefined distance (e.g., 1 ft., 2 ft., 1 yd., etc.) of the front unit 202 to activate the one or more sensors 224. The one or more sensors 224 may send a signal associated with the gesture to a local and/or remote computing system for processing. The local and/or remote computing system may process the signal and interpret the command associated therewith. The local and/or remote computing device may then send an instruction to one or more devices to perform the corresponding action. For example, a gesture by a user cupping a hand to an ear may constitute a command to play music. A camera on the front unit 202 may recognize the gesture as a predefined gesture, and may cause a speaker to play music.

In various examples, the front unit 202 may include one or more speakers 226 to provide an audio presentation. In such examples, the speakers 226 may receive an audio signal from the local and/or remote computing devices based on a command. For example, the weather forecast requested in the example above may be provided in whole or in part as an audio presentation through the one or more speakers 226.

In some examples, the front unit 202 may include an external device port 228, such as external device port 154. The external device port 228 may be configured to receive various an external device such as a speaker, a camera, a storage device (e.g., flash drive, external hard drive, solid state drives, etc.), a display, and the like. In various examples, the front unit 202 may include a mute button 230 configured to mute sound emitted from the one or more speakers 226, an external speaker mounted on the external device port 228, and/or a speaker of an external device.

Figure 3:
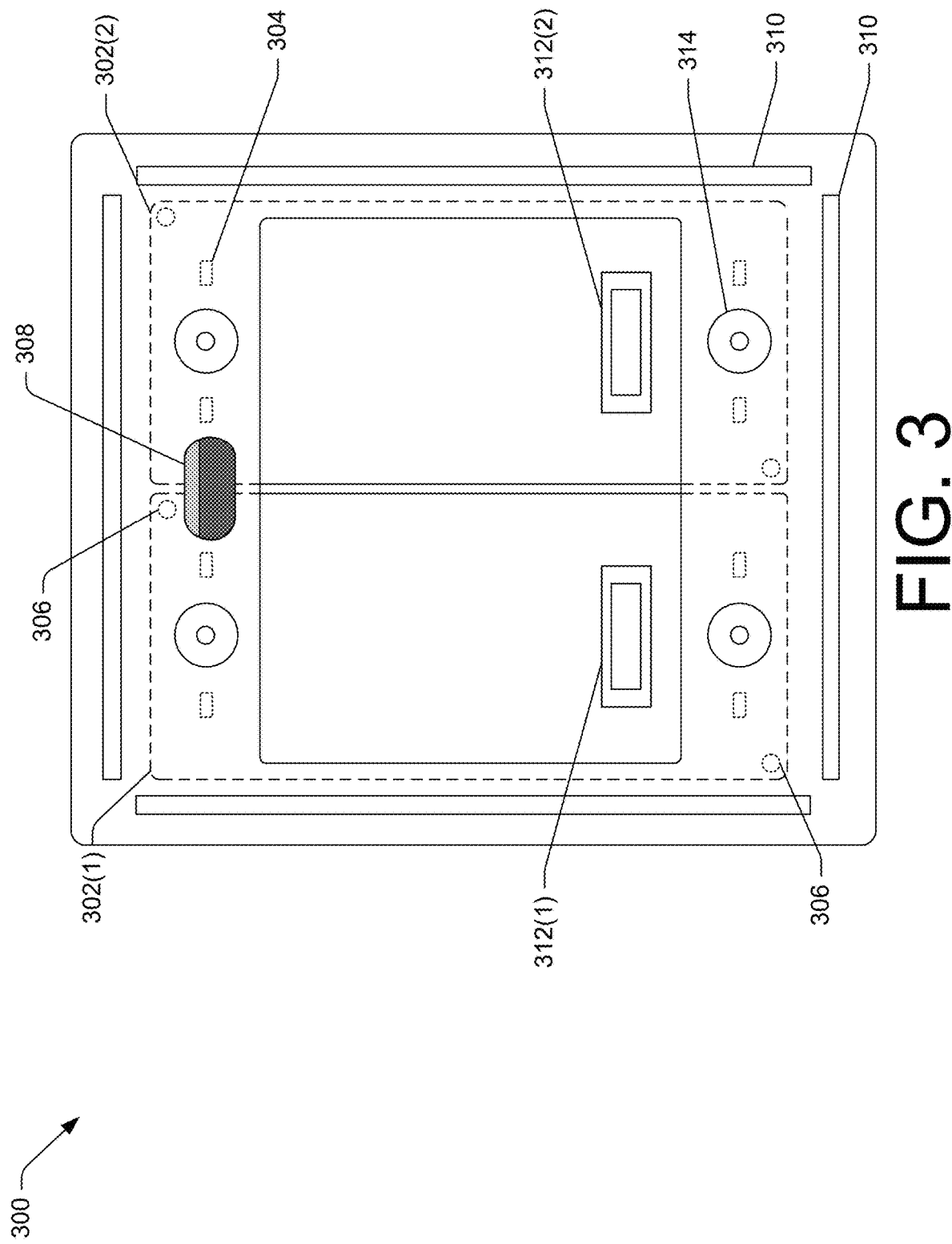
FIG. 3 illustrates an example mounting bracket for a two-gang modular controller.

FIG. 3 illustrates an example mounting bracket 300 for a two-gang modular controller. In various examples, the two-gang modular controller can include a first power unit 302(1) and a second power unit 302(2). Each of the first power unit 302(1) and the second power unit 302(2) may be configured to transfer electrical power and/or data to one or more front units. Prior to connecting the power units 302 to the one or more front units, the power units 302 may be coupled to a mounting bracket 300. The mounting bracket 300 may comprise a metal material, a plastic material, a composite material, and/or other material capable of mounting to a surface. The mounting bracket 300 may be configured to mount the first power unit 302(1) and the second power unit 302(2) to a wall or other substantially flat surface (e.g., an imperfect wall/surface). In various examples, the mounting bracket may be configured to mount the respective power units without relying on a surface flatness for proper alignment.

In various examples, the first power unit 302(1) and the second power unit 302(2) may be recessed into a wall or other substantially flat surface. The respective power units 302 may then be coupled to the mounting bracket 300 via one or more attachment fasteners 304 and/or one or more alignment pins 306. The attachment fasteners can be any type of fastener, including but not limited to snap-fit fasteners, screw fasteners, spring fasteners, snap-fit connectors, magnets, hook and loop connectors, or the like. The alignment pins 306 of the mounting bracket 300 can be configured to mate with alignment holes in the respective power units 302. The mounting bracket 300 may include two or more alignment pins 306 for each power unit 302 to which the mounting bracket 300 is configured to couple. In the illustrative example, the alignment pins 306 are configured to couple to alignment holes in opposite corners of the respective power units 302. In some examples, the alignment pins 306 may be configured to couple to alignment holes in each corner of the respective power unit 302. In other examples, the alignment pins 306 may be configured to couple to the respective power units 302 at any location (e.g., center, corners, top, bottom, etc.) to facilitate alignment of the respective power units 302.

In various examples, the mounting bracket 300 may provide a means by which the power units 302 may be aligned along a horizontal and/or vertical axis. In some examples, the mounting bracket 300 may include a level 308 to facilitate alignment along a horizontal plane. In some examples, the mounting bracket 300 may include one or more mounting surfaces 310 to facilitate alignment of the modular controller to the wall or other surface. The one or more mounting surfaces 310 may comprise integrated spring mechanism, a ball bearing mechanism, foam, rubber, or other surface to facilitate an alignment of the modular controller that is substantially parallel to the surface to which it is mounted (e.g., align power units such that respective front units are substantially parallel to the wall to which it is mounted). For example, the mounting bracket 300 may couple to two power units 302 recessed into a wall that is slightly uneven. The mounting surfaces 310 on the mounting bracket 300 may form around the uneven portions of the wall, and align the mounting bracket 300 and the power units 302 so that, when coupled thereto, the front units 304 of the modular controller are substantially parallel to the wall.

Additionally, the mounting bracket 300 may provide a means by which the first power unit 302(1) and the second power unit 302(2) may be spaced a predefined distance apart from one another. The distance may be determined based on spacing for respective front units, alignment of the front units to respective connectors 312 (such as connector 214 of FIG. 2), thermal considerations for heat dissipation, or other factors affecting the power units 302 and/or front units.

In various examples, the mounting bracket 300 may be configured to align the first power unit 302(1) and the second power unit 302(2) such that a side (e.g., a vertical edge) of a first front unit and a second front unit are substantially parallel to the wall or other surface to which the modular controller is mounted. In some examples, the mounting bracket 300 may be configured to align the first power unit 302(1) and the second power unit 302(2) such that adjacent sides of the first front unit and the second front unit are a predefined distance apart. In some examples, the predefined distance can be approximately zero (0), such that the front units are substantially flush with one another. In other examples, the predefined distance may be larger (e.g., 1 mm, 2 mm, 1 cm, etc.).

As discussed above, the power units 302 may be configured to mechanically couple to a front unit. In various examples, the mounting bracket 300 may include one or more openings 314 to facilitate coupling the front unit to the power units 302. In the illustrative example, the mounting bracket 300 includes four openings 314 for screw-type fasteners. In other examples, the mounting bracket may include a greater or lesser number of openings 314. Additionally, in other examples, the mechanical coupling can include other types of fasteners, such as snap-fit fasteners, magnetic fasteners, or the like. In some examples, the front units may be configured to mechanically couple to the mounting bracket 300.

Additionally, the first power units 302(1) and the second power unit 302(2) may be configured to detachably couple to one or more front units via one or more connectors 312. In various examples, one of the first power unit 302(1) or the second power unit 302(2) may include a connector 312. In such examples, the first power unit 302(1) and the second power unit 302(2) may be coupled to one another to transfer electrical power and/or data in between power modules. In the illustrative example, the first power unit 302(1) and the second power unit 302(2) include connectors 312(1) and 312(2), respectively. In such examples, the first connector 312(1) and the second connector 312(2) may couple to one or more front units. For example, the first power unit 302(1) and the second power unit 302(2) may couple to a single front unit connectors 312(1) and 312(2). Each of connectors 312(1) and 312(2) may provide power and/or data to the front unit, or one of the connectors 312(1) and 312(2) may provide primary power and/or data transfer and the other may provide a backup power and/or data transfer capability. For another example, the first power unit 302(1) may couple to a first front unit via connector 312(1) and the second power unit 302(2) may couple to a second front unit via connector 312(2). The respective power units may provide power and/or data to respective front units. In various examples, the connectors 312 may include a floating (i.e., not fixed) connector that is configured to self-align to a connector of a front unit.

Figure 4:
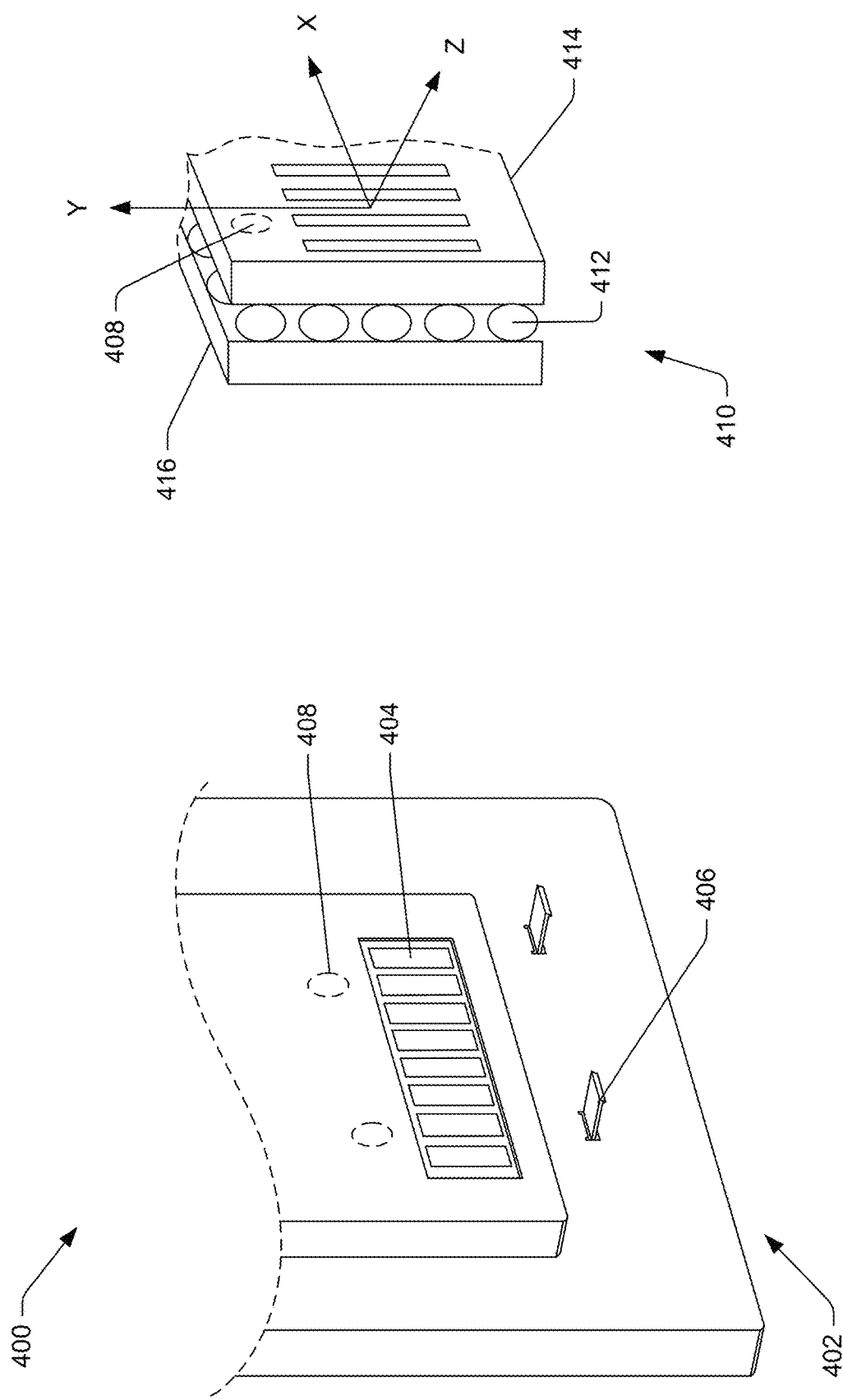
FIG. 4 illustrates an example connector configured to transmit electrical power and/or data between a power unit and a front unit.

FIG. 4 illustrates an example connector 400, such as connector 216 and/or front unit connector 218, configured to transmit electrical power and/or data between a power unit and a front unit. The connector 400 may comprise a floating, self-aligning connector. In some examples, the connector 400 may be a component of the power unit. In the illustrative example, the connector 400 is coupled component of the front unit 402. The connector 400 may comprise a floating connector, configured to self-align (e.g., free to move in a direction to align) one or more pins 404 of the connector 400 to one or more pins on an opposing unit (e.g., pins on the front unit self-align with pins on a power unit and vice versa).

The front unit may include one or more mechanical connectors 406 to couple the front unit to the power unit. The mechanical connectors 406 may include snap-fit connectors, screw-type connectors, spring-type connectors, etc. In the illustrated example, the front unit 402 may mechanically connect via snap-fit mechanical connectors 406 to a power unit. In addition to the mechanical connection, the connector 400 may adjust as necessary to align the pins 404 with pins of the opposing unit to establish an electrical and/or electro-mechanical connection. In various examples, the connector 400 may include one or more magnets 408 to facilitate the alignment of the one or more pins 404.

As shown in cross section 410 of connector 400, the connector 400 may include a fitting 412 between a front plate 414 and a rear plate 416, to facilitate movement along the X, Y, and/or Z axis to facilitate the alignment. The rear plate 416 may be coupled to a power control board or other computing system in the front unit. In some examples, the rear plate 416 may be fixed in position with respect to the front unit 402. In such examples, the front plate 414 may be electrically coupled to the rear plate 416, but may be free to move (e.g., float) along the X, Y, and/or Z axis, the movement being facilitated by the fitting 412 and/or the magnets 408.

In the illustrative example, the fitting 412 includes ball bearings. In other examples, the fitting 412 can include another type of fitting that enables movement of the front plate 414 relative to the rear plate 416 in the X and/or Y direction. The fitting 412 can include a metal, plastic, rubber, polymer, or other material. For example, the fitting 412 can include a layer of silicone in between the front plate 414 and the rear plate 416. Based upon an alignment force in the X and/or Y direction being applied to the front plate 414, such as via magnets 408, the fitting 412 may flex in the respective direction to facilitate the alignment of the pins 404 with pins on the opposing unit. In some examples, a magnetic force of attraction between the magnets 408 and magnets on the opposing unit may cause the front plate 414 to move along the Z axis to facilitate alignment.

Figure 5:
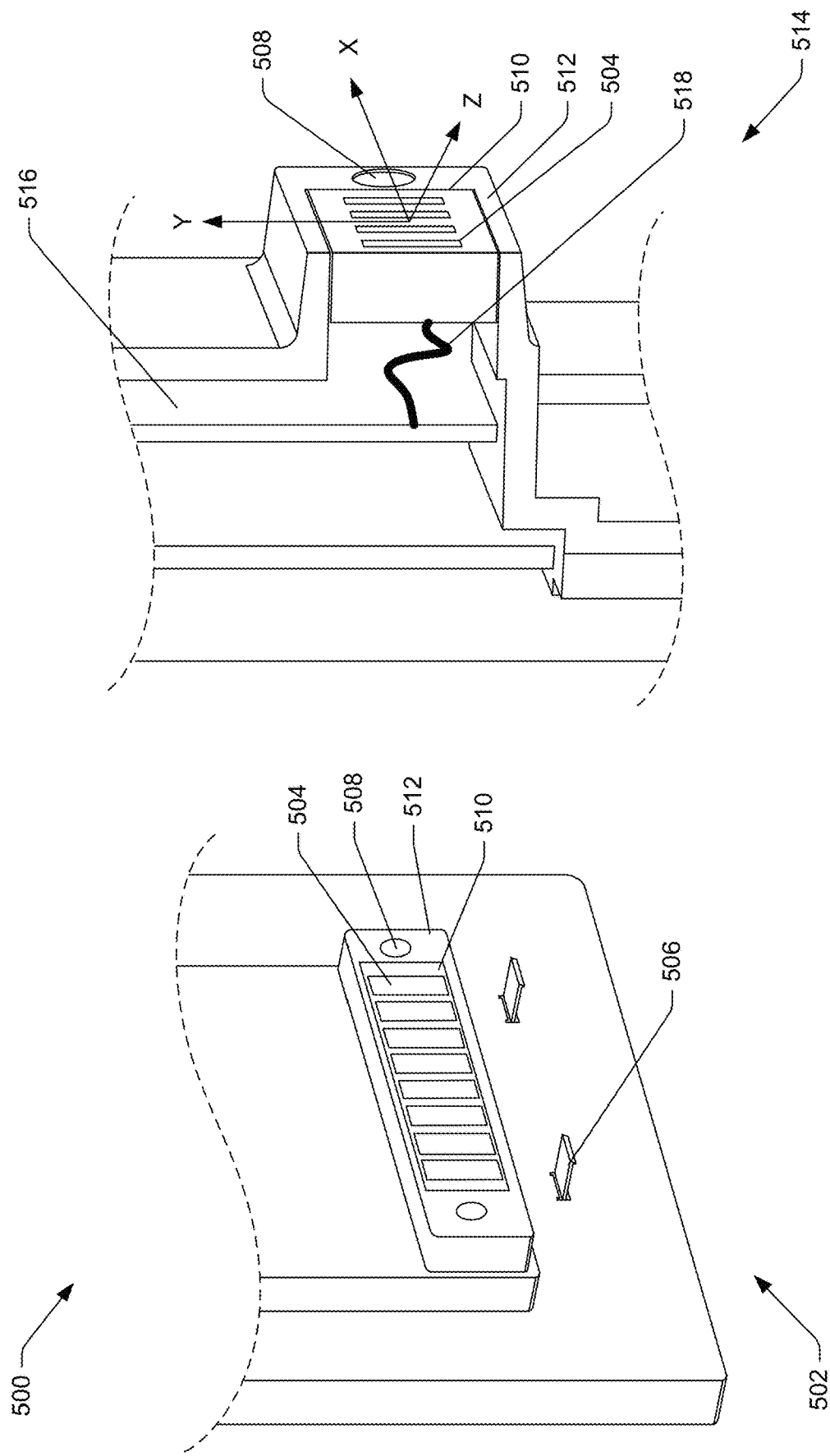
FIG. 5 illustrates another example connector configured to transmit electrical power and/or data between a power unit and a front unit.

FIG. 5 illustrates an example connector 500, such as connector 216 and/or front unit connector 218, configured to transmit electrical power and/or data between a power unit and a front unit 502. In some examples, the connector 500 may be a component of to the power unit. In the illustrative example, the connector 500 is a component of the front unit 502. The connector 500 may comprise a floating connector, configured to self-align (e.g., free to move in a direction to align) one or more pins 504 of the connector 400 to one or more pins on an opposing unit (e.g., pins on the front unit self-align with pins on a power unit and vice versa).

The front unit may include one or more mechanical connectors 506 to couple the front unit to the power unit. The mechanical connectors 506 may include snap-fit connectors, screw-type connectors, spring-type connectors, etc.). In the illustrated example, the front unit 502 may mechanically connect via snap-fit mechanical connectors 506 to a power unit. In addition to the mechanical connection, the connector 500 may adjust as necessary to align the one or more pins 504 with pins of the opposing unit to establish an electrical and/or electro-mechanical connection. The one or more pins 504 may be inset into an inner casing 510 such that each of the one or more pins 504 maintains a substantially fixed position within the inner casing 510.

In various examples, the connector 500 may include an outer casing 512 configured to facilitate movement of the one or more pins 504 along the X, Y, and/or Z axis. The outer casing 512 may comprise a polymer material, a rubber material, or other substantially pliable material. In at least one example, the outer casing 512 includes a silicone rubber material. In various examples, the inner casing 510 may be inset into outer casing 512, and configured to move against the inner walls of the outer casing 512.

In various examples, the connector 500 may include one or more magnets 508 to facilitate alignment of the one or more pins 504. The one or more magnets 508 may be coupled to the inner casing and/or an outer casing 512. In the illustrative example, the magnets 508 are coupled to the outer casing 512 on either side inner casing 510. The magnets 508 may couple to a surface on an opposing unit. In various examples, when the magnets are coupled, the one or more pins 504 may not be sufficiently aligned to the pins on the opposing unit to affect a sufficient electrical power and/or data connection. In such examples, the inner casing 510 may be configured to move in the X, Y, and/or Z direction to ensure proper alignment with the pins on the opposing unit. In some examples, an attraction (e.g., magnetic force) between the one or more pins 504 and the pins on the opposing unit may cause the inner casing 510 to move, and impart a force on the outer casing 512. The outer casing 512 may be configured to flex responsive to the force, to allow the inner casing 510 to move as necessary for proper alignment. In some examples, a frictional coefficient between the inner casing 510 and the outer casing 512 may limit movement of the inner casing 510 along the Z axis.

As illustrated in the cross section 514 of the connector 500, the inner casing 510 may be connected to a power control board 516 or other computing system of the front unit via a flexible cable 518. The flexible cable can connect the power control board 516 or other computing system to the power source (e.g., power unit), and can transmit and receive data to and from the power unit.

Figure 6:
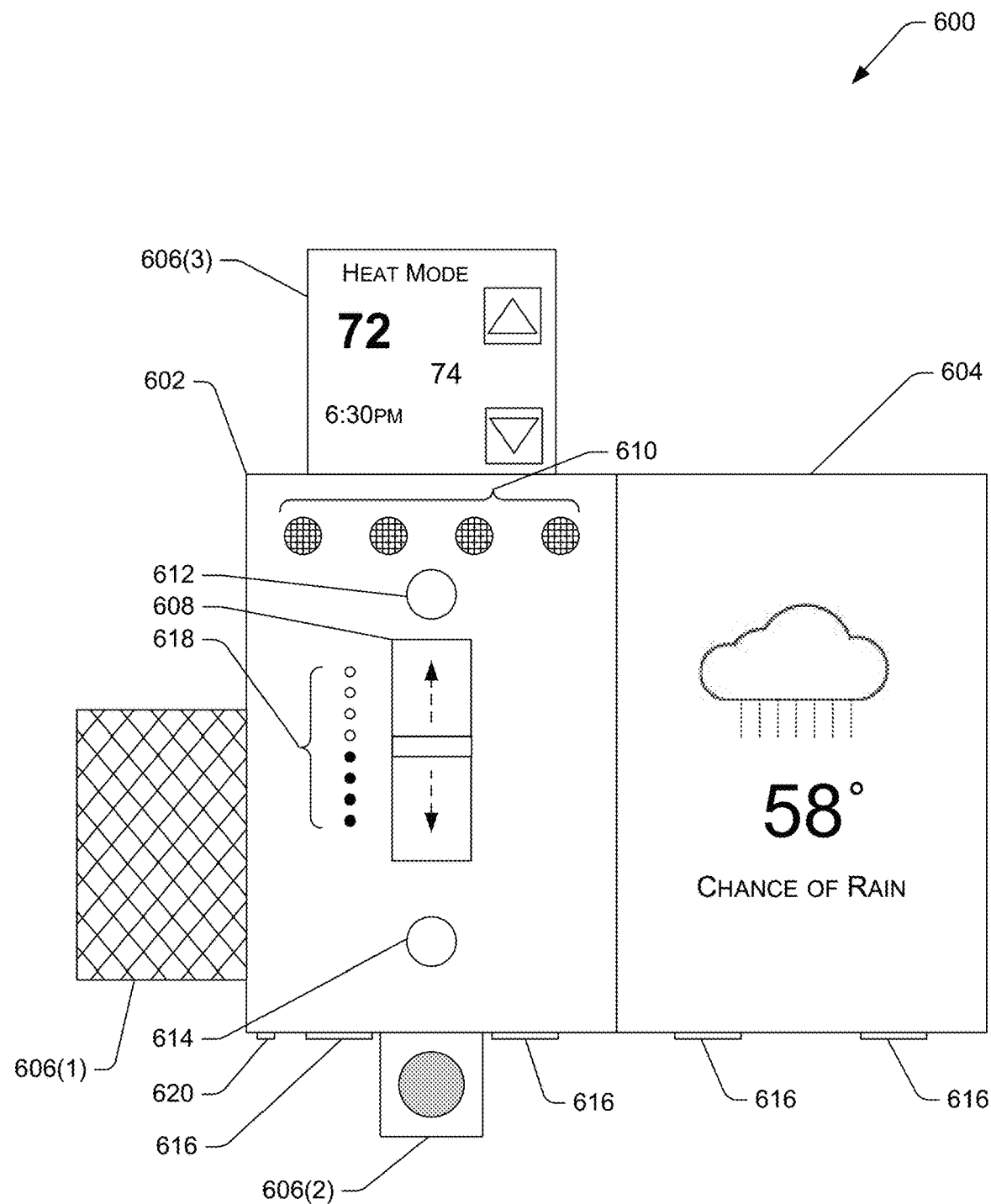
FIG. 6 illustrates a front view of an example two-gang modular controller. In this example, the modular controller includes a first front unit and a second front unit, each with different functionality.

FIG. 6 illustrates a front view of an example two-gang modular controller 600. The modular controller 600 includes a first front unit 602 and a second front unit 604. In various examples, the first front unit 602 and a second front unit 604 may be connected to a single power unit, such as power unit 200, and may be configured to receive power from and/or transmit to and receive data from the power unit. In some examples, the first front unit 602 may be operably connected to a first power unit and the second front unit 604 may be operably connected to a second power unit.

In various examples, a first power unit and the second power unit corresponding to the first front unit 602 and the second front unit 604, respectively, may be coupled to a mounting bracket, such as mounting bracket 300. The mounting bracket may comprise a metal material, a plastic material, a composite material, and/or other material capable of mounting to a surface. The mounting bracket may be configured to mount the modular controller 600 to a wall or other substantially flat surface (e.g., an imperfect wall/surface). In various examples, the mounting bracket may be configured to mount the respective power units without relying on a surface flatness for proper alignment. The mounting bracket may provide a means by which the power units may be aligned on a horizontal and/or vertical axis and properly spaced for spacing of the first front unit 602 and the second front unit 604. In various examples, the mounting bracket may be coupled to one or more power units. In some examples, the mounting bracket may comprise a component of a power unit. In other examples, the mounting bracket may first be mounted to the wall or other substantially flat surface, and the one or more power units may be coupled thereto.

The mounting bracket may be configured to align the respective power units such that a side (e.g., vertical edge) of the first front unit 602 and the second front unit 604 are substantially parallel to the wall. Additionally, the mounting bracket may be configured to align a connector, such as connector 216, of the first front unit 602 and a connector of a second front unit 604 to a connector of a power unit, such as connector 214. In examples in which the first front unit 602 and the second front unit 604 are coupled to respective power units, the alignment may include aligning respective connectors.

In various examples, the first front unit 602 may be mechanically connected to the second front unit 604. In such examples, the first front unit 602 and/or the second front unit 604 may include mechanical connectors (e.g., screw fasteners, spring fasteners, snap-fit connectors, magnets, hook and loop connectors, etc.). In some examples, the first front unit 602 and the second front unit 604 may be independent units (e.g., separate front units) mounted substantially adjacent to one another. In the illustrative example, the first front unit 602 and the second front unit 604 are mounted so that respective sides of the first front unit 602 and second front unit 604 are touching. In other examples, the first front unit 602 and the second front unit 604 may be mounted so that respective sides are spaced a distance apart from one another (e.g., 1 mm, 1 cm, 1 inch, etc.).

In various examples, the first front unit 602 may be operably coupled to the second front unit 604. In some examples, first front unit 602 and the second front unit 604 may be configured to receive commands and cause one or more devices to perform operations. In such examples, the first front unit 602 and the second front unit 604 may be configured to process pre-defined commands. The pre-defined commands (e.g., sets of commands) may include types of commands (e.g., voice, gesture, touch, presence, etc.), devices associated with the commands (e.g., speaker, display, light, etc.), and/or capabilities of the respective front units (e.g., front unit with display configured to process commands associated with a presentation of information). In some examples, the first front unit 602 and the second front unit 604 may identify a command of a respective set of commands based on one or more pre-defined wakewords (e.g., first word in a command). For example, the first front unit 602 may be configured to identify a wakeword "weather" preceding a command. Based on an identification of the word "weather," the first front unit 602 may process the corresponding command. In various examples, the first front unit 602 and the second front unit 604 may identify a command of a respective set of commands based on one or more keywords in the command. In such examples, the first front unit 602 and the second front unit 604 may pre-process a command to identify the one or more keywords. Based on an identification of a keyword, the respective front unit may perform speech processing on the command and/or may send the command to a remote computing device for speech processing. For example, the first front unit 602 may be configured to receive audio commands and the second front unit 604 may be configured to receive gesture commands and/or touch commands. For another example, the first front unit 602 may be configured to process commands directed to a first group of devices, such as lights and speakers, and the second front unit 604 may be configured to process commands directed to a second group of devices, such as commands related to Internet searches and displays of information related to said searches In various examples, a front unit, such as the first front unit 602 or the second front unit 604, may be configured as a central control unit and may receive commands and cause one or more devices to perform operations. In such examples, the front unit may include one or more external device ports, such as external device port 228, configured to provide power and/or data commands to one or more coupleable external devices. In the illustrative example, the external devices 606(1), 606(2), and 606(3) may be coupled to the first front unit, which may act as the central control unit. In such an example, the external devices 606(1) (illustrated as a speaker), 606(2) (illustrated as a camera), and 606(3) (illustrated as a display presenting thermostat data), may present information based on control signals generated by a computing system of first front unit 602 or a remote computing device, responsive to commands from the user. Though the external devices 606(1), 606(2), and 606(3) are illustrated as a speaker, camera, and display, respectively, it is understood that the external devices 606 may include any type of device (e.g., mobile telephone, tablet, speaker, display, camera or other sensor, touch input device, etc.) configured to connect via the one or more external device ports.

The external devices configured to couple to the front unit via an external device port may comprise input and/or output devices, depending on respective device settings. For example, the external device 606(3) can include a computing device configured in a thermostat setting. In the thermostat setting, the external device 606(3) may include a touch screen input to increase and/or decrease the temperature setting. The input received via the touch screen may be transmitted to the front unit via the external device port, for further processing (e.g., sending a control signal to a heater to turn on). For another example, the user may issue a command to the front unit to change the external device 606(3) setting from a thermostat setting to a security system setting. Responsive to the command, the front unit 602 may send a signal to the external device 606(3) to change settings. In the security screen setting, the external device 606(3) may be configured to present data, such as streaming video data from one or more security cameras.

In some examples, the second front unit 604 may comprise an external device that is coupled to an external port of the first front unit 602. For example, a first front unit 602 may be configured as a central control unit and may receive commands to present a weather forecast and thermostat (e.g., temperature of the home environment) data. Responsive to the commands, the first front unit 602 may send a first control signal to the second front unit 604 to cause the display to present the weather forecast, and a second control signal to the external device 606(3) to present thermostat data.

As described above with regard to FIG. 1, the first front unit 602 and/or the second front unit 604 may include a number of input and/or output devices. As shown in FIG. 6, the first front unit 602 includes a mechanical switch 608 (e.g., mechanical switch 220 of FIG. 2), a microphone array 610, (e.g., microphone array 222 of FIG. 2), a sensor 612, (e.g., sensor 224 of FIG. 2), a mute button 614 (e.g., mute button 230 of FIG. 2), speakers 616 (e.g., speakers 226 of FIG. 2), a level indicator 618, and a reset switch 620.

The level indicator 618 may provide a visual indication of a level of output (e.g., volume of a speaker, brightness of a light, etc.) of one or more devices. In various examples, the level indicator 618 may be configured to continually present the level of output of a single device. In such examples, one or more lights on the level indicator 618 may illuminate to illustrate a level of output of the single device. For example, the level indicator 618 may represent a volume of the one or more speakers 616. In some examples, the level indicator 618 may be configured to present the level of output of one or more devices for a predefined period (e.g., 5 seconds, 10 seconds, 1 minute, etc.) and/or until a voice command to change a level of output of another one of the one or more devices is received. In such examples, the level indicator 618 may present the corresponding level of output based on a voice command to present the level of output of a particular device and/or a voice command to adjust the level of output of a particular device. For example, a user may issue a first voice command to adjust the lighting from a level 4 (as depicted) to a level 2. Responsive to the first voice command, the level indicator 618 presents the level 2 of the light. The user may then issue a second voice command to adjust a volume of a speaker from a level 6 to a level 4. Responsive to the second command, the level indicator 618 presents the level 4 of the speaker.

The reset switch 620 may be configured to temporarily remove and restore power (e.g., reboot a computing system of a front unit) to the first front unit 602 and/or the second front unit 604. The reset switch 620 may comprise a button, a toggle switch, or other mechanical device configured to remove and restore power to the front units 602 and/or 604. In some examples, the first front unit 602 and/or the second front 604 of the modular controller 600 may include a disconnect switch configured to rapidly remove power and/or a data connection from the first front unit 602 and/or the second front unit 604. Additionally or alternatively, the disconnect switch may be configured to remove power and/or a data connection from one or more power units coupled to the modular controller 600.

In various examples, the second front unit 604 may include a reset and/or disconnect switch configured to perform the respective functions on the second front unit 604 when activated. In such examples, respective reset and/or disconnect switches may be activated to reset and/or disconnect power to respective front units. For example, activation of a reset button on the second front unit 602 may cause a reboot of a computing system driving the second front unit 604.

As illustrated, the second front unit 604 may include a display for presenting information. The display may be a light-emitting diode (LED) display, an organic light-emitting diode (OLED) display, an active-matrix OLED a thin film transistor (TFT) display, a thin film diode (TFD) display, color super twisted nematic (CSTN) display, a quantum dot display, carbon nanotubes, or any other type of display. In various examples, the display may be configured to receive touch input, such as through a capacitive touchscreen or a resistive touchscreen. Additionally or alternatively, the second front unit 604 may include one or more other components, such as one or more speakers 614, a mute button, a microphone array, one or more sensors, an external drive port, a mechanical switch, a level indicator, and the like.

Figure 7A:
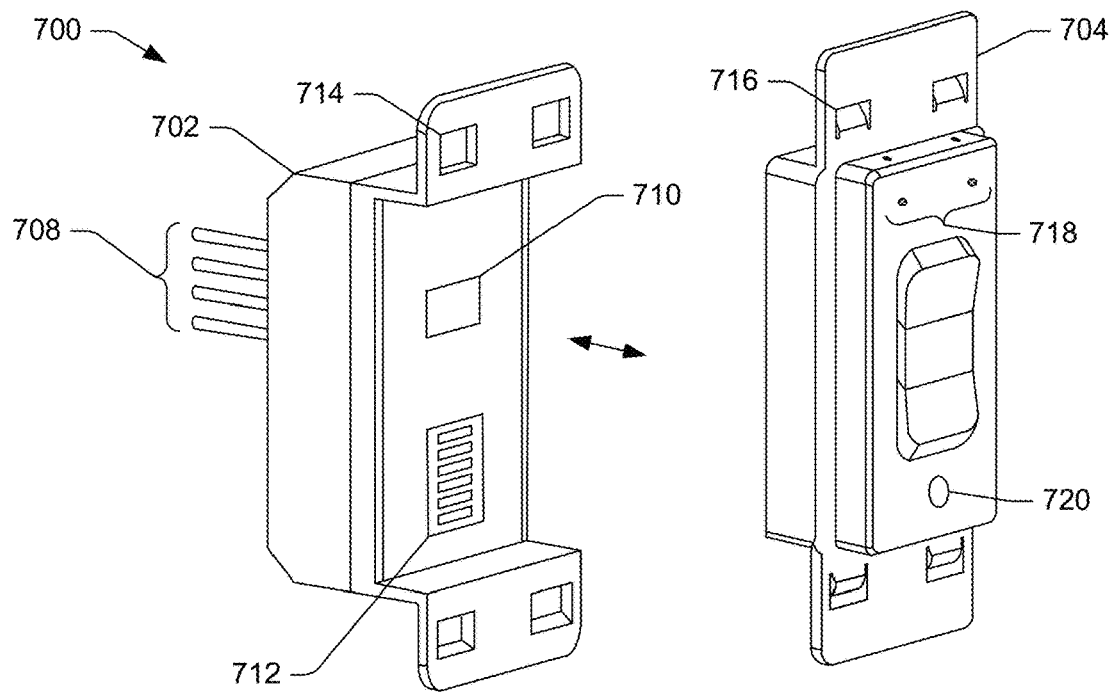
FIG. 7A illustrates a perspective view of an example modular controller having a front unit with a front panel configured to fit within an opening of a standard wallplate.
Figure 7B:
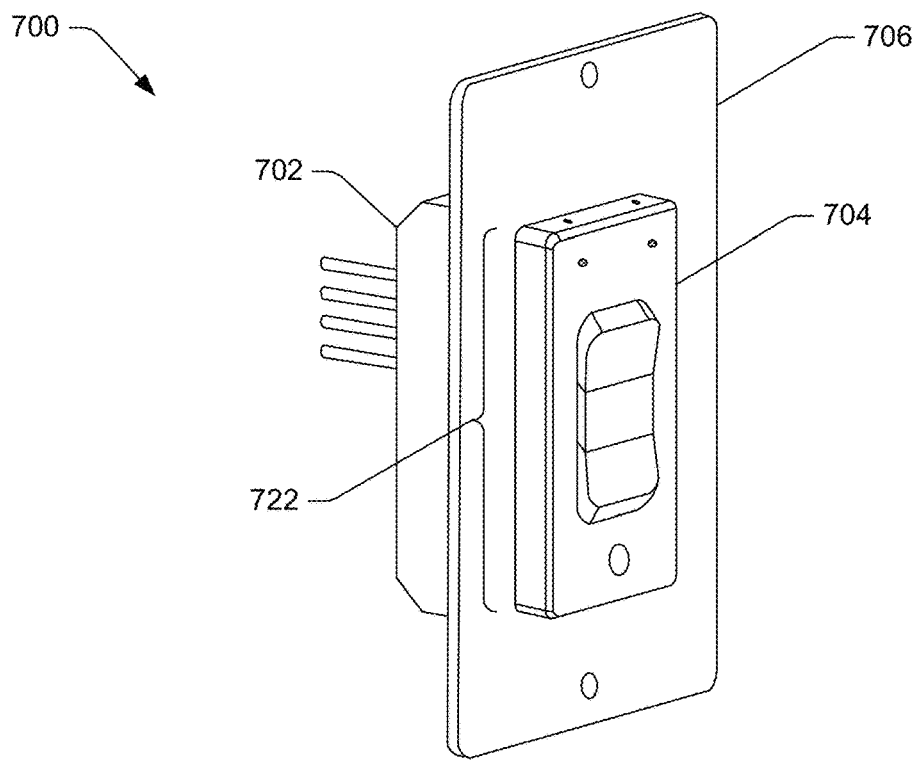
FIG. 7B illustrates the assembled modular controller of FIG. 7A with the standard wallplate mounted on the modular controller.

FIGS. 7A and 7B illustrate perspective views of an example modular controller 700 comprising a power unit 702 and a front unit 704 configured to couple to a wallplate 706. The wallplate 706 may be a standard, off-the-shelf size and/or style wallplate (e.g., WeMo®, Wink®, Luton®, Leviton®, Decora®, GE® wallplates, etc.) used in a home environment. FIG. 7A illustrates the power unit 702 (e.g., power unit 200 of FIG. 2) and the front unit 704 (e.g., front unit 202 of FIG. 2) of the modular controller 700.

As discussed above, the power unit 702 may receive electrical power via one or more wires 708. The one or more wires 708 may couple to the power unit 702 via a terminal. In various examples, the one or more wires 708 may include one or more electrical wires (e.g., hot, ground, load, neutral). In some examples, the wires 708 may include one or more power-line communication wires configured to transmit power and/or data. In some examples, the wires 708 may include network communication wires (e.g., Ethernet cable, or other network cable). The power unit 702 may include a relay for on/off functionality. In some examples, the power unit 702 may include a disconnect switch 710 (e.g., a kill switch) to shut off electricity and/or a network connectivity to the power unit.

The power unit 702 may be configured to convert the received electrical power into a format compatible with the front unit 704. The power unit 702 may then transfer the converted electrical power and/or data to the front unit 704 via a connector 712. As discussed above with regard to FIGS. 4 and 5, the connector 712 may be a floating connector configured to self-align to a connector of the front unit 704. In the illustrative example, the connector 712 includes six pins. In other examples, the connector 712 may include a greater or lesser number of connection points. In yet other examples, the connector 712 may include a port for power and/or data transfer. In such examples, the front unit 704 may include wires configured to plug into the respective power and/or data transfer ports.

As discussed above, the front unit 704 may be configured to detachably couple to the power unit 702. The power unit 702 may include one or more fasteners 714 configured to couple to one or more fasteners 716 of the front unit 704. In the illustrative example, the fasteners 714 and 716 include snap-fit fasteners. In other examples, the fasteners 714 and 716 may include magnets, screw type fasteners, spring fasteners, hook and loop fasteners, and the like. In various examples, the connector 712 and the fastener 714 may comprise a single component of the power unit 702. In other words, the connector 712 may be configured to transfer electrical power and/or data, and to couple the front unit 704 to the power unit 702.

The front unit 704 may receive electrical power from the power unit 702 to power one or more devices (e.g., components). The one or more devices may include a microphone array 718 configured to receive voice commands. The microphone array 718 may include one or more microphones on a front, top, bottom, and side surface of the front unit 702. As discussed above, the microphone array 718 may be configured to receive a voice command and generate an audio signal to send to a computing system for control signal generation to cause an action corresponding to the voice command to occur. In various examples, the microphone array may include an expandable array. In such examples, the microphone array may include one or more adjustable microphones configured to slide, swing, or otherwise move into a second position to extend a length, width, and/or height of the microphone array.

Additionally or alternatively, the one or more devices may include one or more sensors 720 configured to identify a touch, a gesture, and/or a physical presence of a user in an environment, and cause a corresponding signal to be generated. The one or more sensors 720 may send the signal to a computing system, which may cause the corresponding action to be performed. In various examples, the computing system may process the signal and generate a control signal to send to one or more devices to perform the corresponding action. In some examples, the computing system may automatically cause the action to be performed, based on a determination that a pre-defined condition has been met (e.g., physical presence, time of day, day of week, etc.). For example, a sensor 720 on a front unit 704 located in a kitchen may recognize the presence of a user in the room. Responsive to the recognition, the computing system may automatically cause a light to turn on.

In various examples, the computing system of the front unit 704 may be configured to identify a time of day, a day of the week, a season, or other date and/or time related condition. In such examples, actions related to date and/or time conditions may be stored in a data store of the computing device (e.g., on the front unit and/or by a remote service), such as in a user profile. In response to recognizing the date and/or time condition is met, the computing device may cause a corresponding action to be performed. For another example, a computing system on the front unit 704 located in a kitchen may recognize that a time of day is 6:00 am and the day of the week is a Monday. Responsive to the determination and based on a setting stored in a data store, such as in a user profile, the computing system may cause a light and a coffee maker in the kitchen to turn on.

Figure 8A:
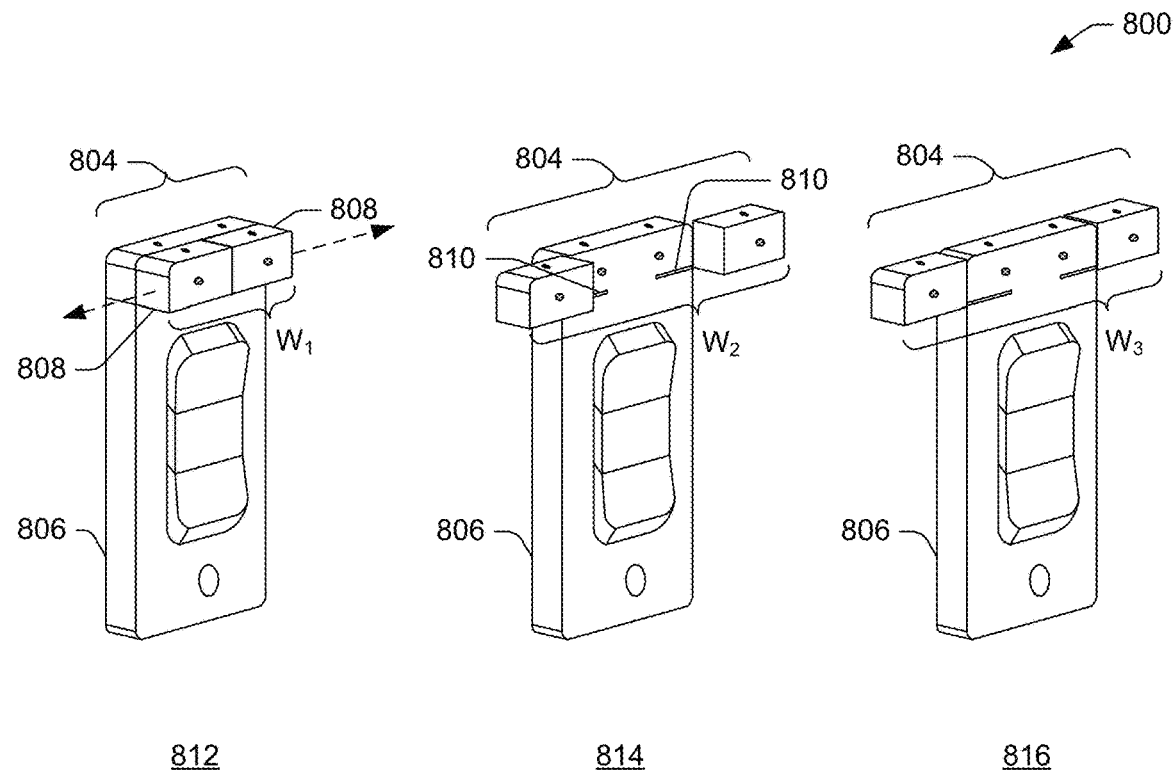
FIG. 8A illustrates a sequence of views showing an example microphone array expanding on a front panel of a front unit by sliding microphones of the microphone array into a second position.
Figure 8B:
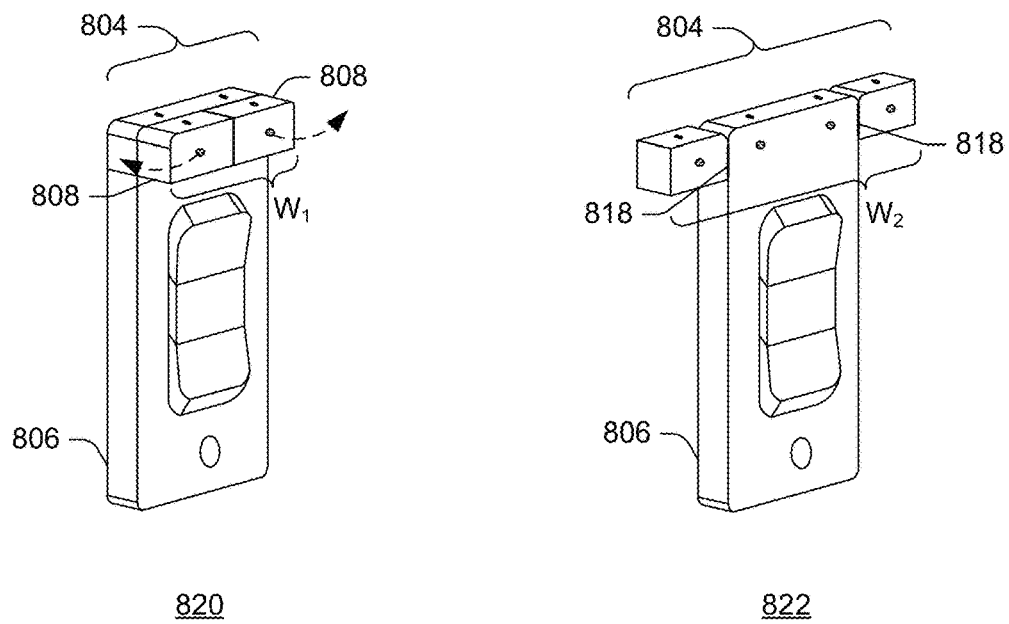
FIG. 8B illustrates a sequence of views showing an example microphone array expanding on a front panel of a front unit by swinging microphones of the microphone array into a second position.

FIG. 7B illustrates the assembled modular controller 700 of FIG. 7A with the wallplate 706 mounted on the modular controller 700. As illustrated, a front panel 722 of the front unit 704 may be sized to fit within an opening of the wallplate 706. After insertion, the wallplate 706 may substantially surround the front panel 722. In various examples, the front panel 722 may include one or more components configured to extend beyond the opening of the wallplate 706 after the wallplate 706 is mounted adjacent to the modular controller 500. For example, as illustrated in FIGS. 8A and 8B, the front panel 722 may include an expandable microphone array. In some examples, the front panel 722 may include an expandable section configured to slide or otherwise extend beyond the opening of the wallplate 706.

The wallplate 706 may include an off-the-shelf Decora® style wallplate, or another style of wallplate used in an environment. In the illustrative example, the wallplate 706 comprises a one-gang wallplate. In other examples, the wallplate 706 may comprise a two-gang wallplate, a three-gang wallplate, etc. In such examples, two or more modular controllers 700 may be mounted adjacent to one another such that respective front panels 722 of respective front units 704 fit within each gang of the wallplate 706. In various examples, two or more front units 704 may couple to a single power unit 702. In some examples, each front unit 704 may couple to a respective power unit 702.

In various examples, the wallplate 706 may couple to a surface (e.g., a wall) in the environment. In some examples, the wallplate 706 may couple to the power unit 702 mounted in the surface and/or the front unit 704. The wallplate 706 may couple to the surface, the power unit 702, and/or the front unit 704 via one or more mechanical connectors (e.g., screw fasteners, spring fasteners, snap-fit connectors, magnets, hook and loop connectors, etc.).

FIGS. 8A and 8B illustrate an example processes 800 and 802, respectively, of extending an expandable microphone array 804 on a front panel 806, such as front panel 722 of a front unit, such as front unit 704. The expandable microphone array 804 may include at least one adjustable microphone 808. The adjustable microphone 808 may be configured to slide, swing, or otherwise move from a first (e.g., stored) position into a second (e.g., expanded) position. The adjustable microphone 808 may include one or more microphones on a front surface, a top surface a bottom surface, and/or a side surface. For example, as shown in FIG. 8A, the adjustable microphone 808 may include a microphone on a front surface and a microphone on a top surface. For another example, as shown in FIG. 8B, the adjustable microphone 808 may include a microphone on a front surface and a microphone on a side surface. In various examples, the expandable microphone array 804 may be included in a front panel 806 configured to fit in an opening of a wallplate. In some examples, the expandable microphone array 804 may be included in a larger front panel, such as the front panel of front unit 202 of FIG. 2.

FIG. 8A illustrates a process of sliding microphones of the expandable microphone array 804 from a first position into a second position, such as via a slider 810. At 812, the adjustable microphones 808 may be stowed in a first position. In the first position, the expandable microphone array 804 may comprise a width $W_1$. In the illustrative example, the adjustable microphones 808 together comprise a width that is substantially the same as a width of the front panel 806. In other examples, the adjustable microphones 808 together may comprise a width that is smaller than the width of the front panel 806. Thus, in the first position, the front panel 806 with the adjustable microphones 808 may be inserted into an opening of a wallplate, such as wallplate 706.

At 814, the adjustable microphones 808 may be moved (e.g., slid) into a second position in which a width of the expandable microphone array 804 may comprise a width $W_2$. In the illustrative example, the slider 810 may guide the adjustable microphones 808 substantially perpendicular from a vertical axis of the front panel 806 (e.g., horizontal). In other examples, the slider 810 may be configured to guide the adjustable microphones 808 in a direction that is substantially parallel to the vertical axis of the front panel 806 (e.g., vertical), or in any direction in between vertical and horizontal.

In various examples, the front unit may include a securing mechanism to secure the adjustable microphones 808 in the second position. In such examples, the adjustable microphones 808 may be offset with a front surface of the front panel 806. In some examples, the second position may be a transitory position through which the adjustable microphones 808 may transition through to be placed in a third position.

In various examples, at 816, the adjustable microphones 808 may be moved into the third position. In such examples, the front panel 806 may include sliders 810 on the side surfaces to guide the adjustable microphones 808 into the third position. In the third position, the expandable microphone array 804 may comprise a width W3. In the illustrative example, the width W3 is substantially the same as the width $W_2$ at 814. In other examples, the width W3 may be greater or less than the width $W_2$. In various examples, in the third position, one or more surfaces of adjustable microphones 808 may be substantially flush with one or more surfaces of the front panel 806. For example, as illustrated, the front, top, and back surfaces of the adjustable microphones 808 are substantially flush with the front, top, and back surfaces of the front panel 806. In various examples, the securing mechanism of the front unit may be configured to secure the adjustable microphones 808 in the third position.

FIG. 8B illustrates the example process 802 of adjustable microphones 808 of the microphone array into a second position by swinging the adjustable microphones 808 about a hinge 818.

At 820, the adjustable microphones 808 may be stowed in a first position. In the first position, the expandable microphone array 802 may comprise a width $W_1$. In the illustrative example, the adjustable microphones 808 together comprise a width that is substantially the same as a width of the front panel 806. In other examples, the adjustable microphones 808 together may comprise a width that is smaller than the width of the front panel 806. Thus, in the first position, the front panel 806 with the adjustable microphones 808 may be inserted into an opening of a wallplate, such as wallplate 706.

At 822, the adjustable microphones 808 may be moved (e.g., swung) into a second position in which a width of the expandable microphone array 802 may comprise a width $W_2$. In the illustrative example, the hinge 818 may guide the adjustable microphones 808 through about 90 degrees of movement about an axis perpendicular to the vertical axis of the front panel 806, from the first position to the second position. In other examples, the hinge 818 may be configured to guide the adjustable microphones 808 greater or less than a 90 degree angle. In various examples, the front panel 806 may include one or more arms coupled to the adjustable microphones 808. In such examples, the one or more arms may be configured to swing about the hinge 818 in order to increase the width $W_2$.

In various examples, the front panel 806 may include a securing mechanism to secure the adjustable microphones 808 in the second position. In some examples, the second position may be a transitory position through which the adjustable microphones 808 may transition through to be placed in a third position.

Figure 9:
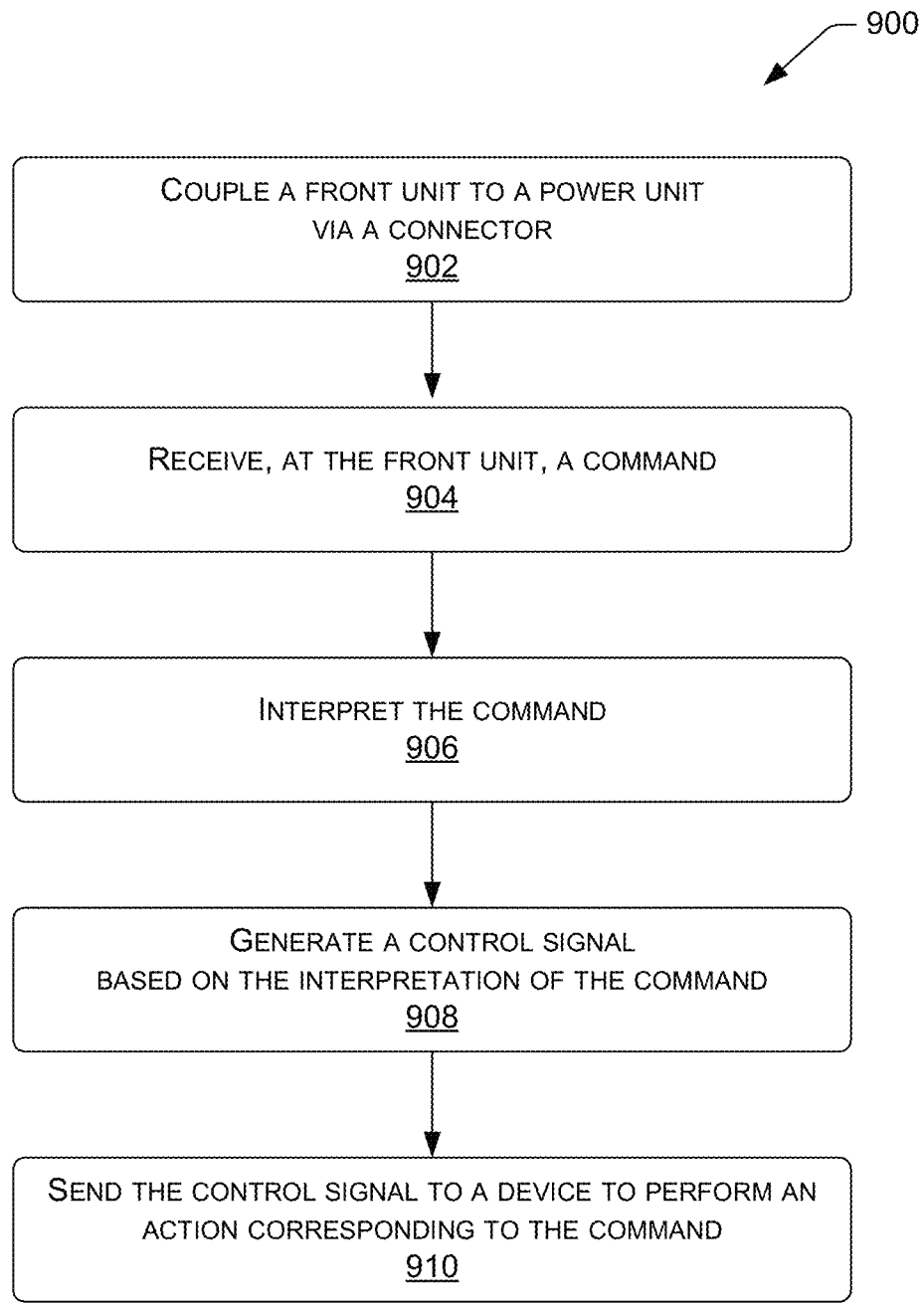
FIG. 9 illustrates an example process for remotely controlling a device of an environmental and/or entertainment control system using a modular controller.
Figure 10:
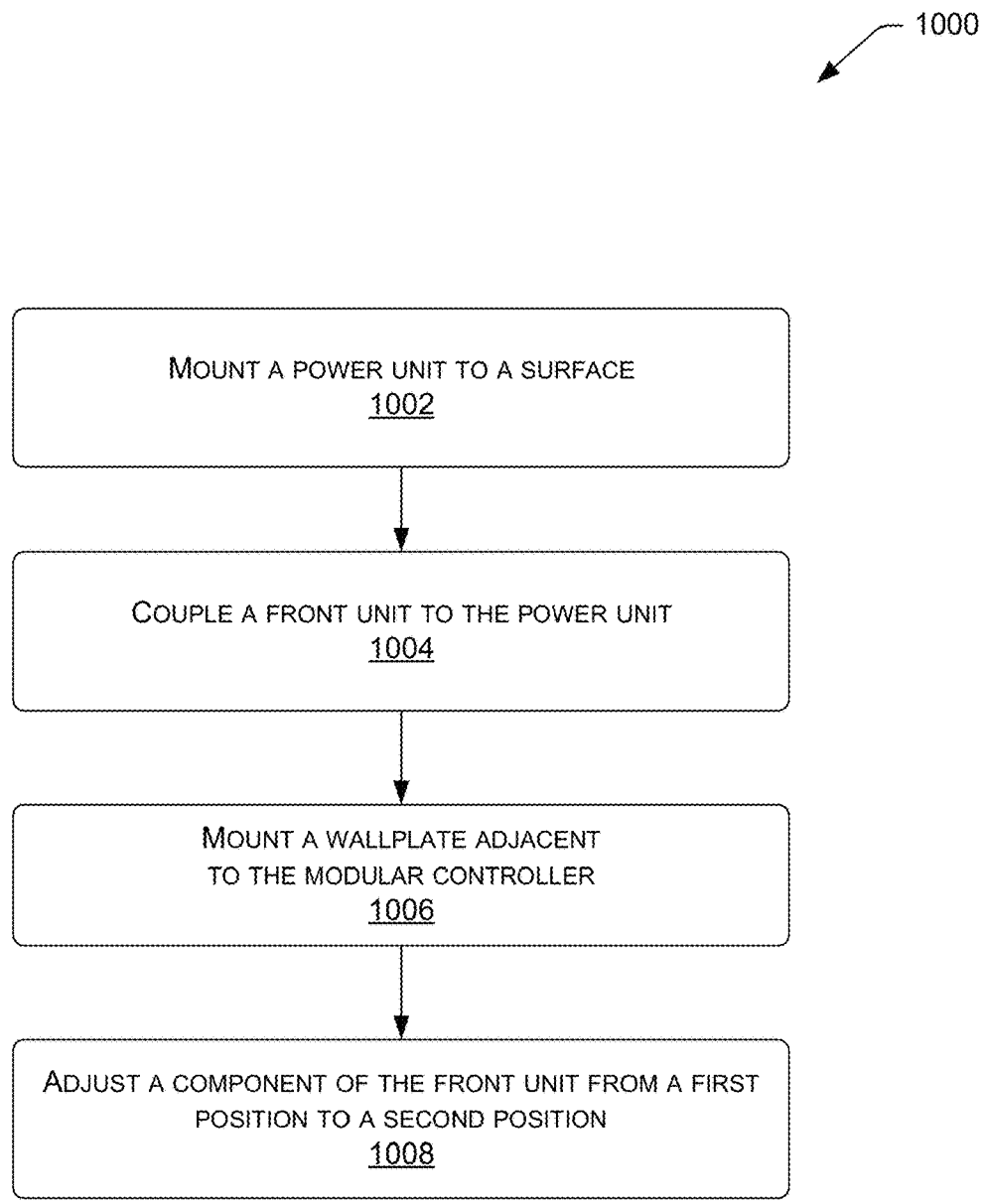
FIG. 10 illustrates an example process for configuring a modular controller for use in an environmental and/or entertainment control system.

FIGS. 9 and 10 are flow diagrams depicting example processes 900 and 1000 for configuring a modular controller and using said modular controller for an environmental and/or entertainment control system. The operations of the example processes are illustrated in individual blocks and summarized with reference to those blocks. The processes are illustrated as logical flows of blocks, each block of which may represent one or more operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like, that perform particular functions or implement particular abstract data types. The order in which the operations are described is not intended to be construed as a limitation, and any number of the described operations can be combined in any order and/or in parallel to implement the process.

FIG. 9 illustrates an example process for remotely controlling a device of an environmental and/or entertainment control system using a modular controller.

At 902, a front unit may be coupled to a power unit via one or more connectors. The connector(s) may be configured to transfer electrical power and/or data between the power unit and the front unit. In some examples, the connector(s) may include electro-mechanical connectors. In some examples, the connector(s) may include one or more floating connectors. In such examples, a floating connector on the power unit and/or front unit may be configured to self-align with a second connector on the other unit. For example, a floating connector on the power unit may be configured to self-align with a floating connector on the front unit. For another example, a floating connector on the power unit may be configured to self-align with a stationary connector on the front unit.

In various examples, two or more front units may be coupled to the power unit. In some examples, two or more front units can be coupled to respective power units. In such examples, the modular controller can include a two-gang, three-gang, etc. modular controller.

In some examples, one or more devices can be coupled to the front unit via one or more external device port. In such examples, the front unit may include a central command unit configured to process commands for the one or more devices to perform one or more actions. At 904, a computing system may receive a command from a user in an environment. The computing system may be internal and/or external to the front unit. The command may be received and initially processed by one or more input devices of the front unit. Responsive to receiving the command, the input device(s) may generate a signal comprising the command to deliver to the computing system.

The command may comprise a voice command, a gesture command, a touch command, and/or presence data. The command may include a request made by the user for the front unit of the modular controller to cause one or more devices in the environment to perform an action (e.g., an operation). The command may include a request for the front unit to cause a device of the front unit to perform an action and/or a request for the front unit to cause an external device to perform an action.

At 906, the computing system may interpret the command. In various examples, the computing system may process the signal to determine the contents thereof. In some examples, the computing system may use image recognition techniques to identify a gesture and/or a presence of a user. In some examples, the computing system may process touch input of a user. Additionally or alternatively, the computing system may use speech processing techniques to determine one or more words in the signal. The computing system may interpret the command by comparing the images and/or words in the signal to words, phrases, touch input, gestures, and/or presence settings in a data store. In some examples, one or more of the words, touch input, phrases, gestures, and/or presence settings may be user-specific and stored in a user profile. For example, a user may program a front unit located in a living room to play music from Pandora® when the user issues a voice command to play music. In some examples, the words, touch input, phrases, gestures, and/or presence settings stored in the data store may be time specific. For example, a computing system may be configured to recognize a presence of a user in a room. The computing system may also determine that a time of day is after a time associated with sunset. Based on the determination of the time being after sunset and the presence recognition, the computing system may cause a light in the room to turn on.

Additionally, the computing system may identify one or more devices associated with the command. The device may include a device internal to the front unit and/or an external device. In various examples, the computing system may identify a device controller of the identified device(s).

At 908, the computing system may generate a control signal based, at least in part, on the interpretation of the command. In various examples, the computing device may generate the control signal based, at least in part, on the device and/or device controller identified at 906. For example, a format of a control signal may be based on the recipient device and/or device controller. The control signal may include one or more instructions to a device to perform an action. In some examples, the computing system may generate a control signal for each device associated with the command. For example, a command to turn on a light and play music may result in the generation of a first control signal to the light to turn on and a second command to a speaker to play music.

At 910, the computing system sends the control signal to a device to perform an action corresponding to the command. The device may include a device internal to the front unit (e.g., a speaker in the front unit), coupled to the front unit, such as via an external device port, and/or a remote device external to the front unit. The control signal may be sent directly to the device and/or via the front unit. In various examples, the control signal may be sent to a device controller to activate the desired device functionality. Responsive to receiving the control signal, the device may perform the action.

FIG. 10 illustrates an example process for configuring a modular controller for use in an environmental and/or entertainment control system.

At 1002, a power unit may be mounted to a surface. In various examples, the surface may include a wall in an environment. In some examples, the power unit may be inset into the surface such that a back side of a face plate is substantially flush against the surface. In some examples, the inset may result in a front surface of the power unit being substantially flush with the surface.

In some examples, two or more power units may be mounted to the surface. In such examples, the power units may be mounted to a surface using a bracket. The bracket may align the power units to the surface. Additionally, the bracket be configured to align the power units and/or respective front units coupled to the power units. In some examples, the bracket may align the front units such that the adjacent sides of the front units may be substantially flush with one another (e.g., about 0 cm spacing), the adjacent sides may be substantially parallel to the surface, and/or a bottom side may be substantially parallel to a floor surface (e.g., substantially perpendicular to the wall). In some examples, the bracket may align the front units such that adjacent sides are a distance apart (e.g., 1 cm, 2 cm, 5 cm, etc.).

At 1004, a front unit may be coupled to the power unit, such as via one or more connectors. The one or more connectors may include electrical and/or mechanical connectors. In some examples, the mechanical connectors may include fasteners, magnets, snap-fit connectors, hook and loop connectors, or the like. In some examples, the electrical connectors may include a pogo pin, or other pin configured to transfer electrical power and/or data.

In some examples, the connector(s) may include one or more floating connectors. In such examples, a floating connector on the power unit and/or front unit may be configured to self-align with a second connector on the other unit. For example, a floating connector on the power unit may be configured to self-align with a floating connector on the front unit. For another example, a floating connector on the power unit may be configured to self-align with a stationary connector on the front unit.

In various examples, the front unit may be configured to receive user input, such as voice commands, gesture commands, touch commands, and/or presence input to provide environmental and entertainment control in an environment. The front unit may comprise various functionalities, such as providing an audio presentation, a visual presentation, and/or a haptic presentation. One or more front units may be selected to couple to one or more power units at various locations in the environment based, at least in part, on the respective functionalities of the one or more front units. For example, a front unit configured with a display and a speaker may be selected to couple to a power unit in a foyer. In such an example, the front unit may provide a visual and/or audio display of a weather forecast to a user in the foyer.

In some examples, the front unit may include one or more adjustable components (e.g., devices). in such examples, the adjustable component(s) may be configured to adjust from a first position (e.g., stowed) to a second position (e.g., deployed).

At 1006, a wallplate may be mounted adjacent to the modular controller. The wallplate may be a standard, off-the-shelf size and/or style wallplate. The wallplate may be mounted to the surface, the power unit, and/or the front unit via one or more mechanical connectors (e.g., screw fasteners, spring fasteners, snap fit lock connectors, magnets, etc.). In various examples, when mounted, the wallplate may substantially surround the front unit.

At 1008, a component (e.g., device) of the front unit may be adjusted from a first position associated with a stowed position, to a second position associated with a deployed position. The component may include, in whole or in part, a microphone array, a speaker, a display, and/or other component of the front unit. In various examples, an adjustment to the component may increase the performance of the front unit. For example, a front unit configured to fit within an opening of the wallplate may have a smaller height and/or width. Including an adjustable component on the front unit may increase the capabilities of the front unit, providing a greater area in which the components may fit.

In some examples, an adjustment to the component may increase the performance of the component. For example, the component may include a microphone array. The microphone array may include four stationary microphones and four adjustable microphones. The four adjustable microphones may thus be adjusted from the first position to the second position, increasing the effective height and/or width of the microphone array, thereby increasing its performance.

In some examples, the front unit may include two or more adjustable components. In such examples, the two or more adjustable components may be adjusted from the first position to the second position. In some examples, the front unit itself may be adjustable. In such examples, the front unit may include a stationary section and one or more adjustable sections. The adjustable front unit may comprise a greater height and/or width than a non-adjustable front unit.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A wall-mounted modular controller comprising:
   a power unit configured to couple to a surface of a wall in an environment, the power unit comprising:
      a terminal configured to couple to a power source; and
      a first connector; and
   a front unit configured to detachably couple to the power unit, the front unit comprising:
      a second connector configured to couple to the first connector for power transfer;
      a microphone array located closer to a first end of the front unit than a second end of the front unit, the second end being opposite to the first end;
      at least one loudspeaker located closer to the second end than the first end;
      a mechanical switch located between the microphone array and the at least one loudspeaker;
      a wireless network interface;
      one or more processors; and
      one or more non-transitory computer readable media storing computer-executable instructions that, when executed by the one or more processors, cause the one or more processors to perform operations comprising:
         receiving, via the microphone array, an audio signal comprising a request for the wall-mounted modular controller to cause an external device in the environment to perform an action;

sending the audio signal to a remote computing device via the wireless network interface, the remote computing device being configured to perform speech processing to identify the external device and the action associated with the audio signal;
receiving, via the wireless network interface, a control signal corresponding to the action, the control signal comprising an identification of the external device; and
sending the control signal to the external device.

2. The wall-mounted modular controller of claim 1, wherein the power unit comprises a form factor configured to fit in at least one of a single gang or a double gang junction box.

3. The wall-mounted modular controller of claim 1, wherein the microphone array comprises an adjustable microphone configured to move from a first position to a second position.

4. The wall-mounted modular controller of claim 1, further comprising another front unit coupled adjacent to the front unit, the other front unit comprising at least one of a display screen or a loudspeaker.

5. A device comprising:
a power unit configured to couple to a surface in an environment and to couple to a power source, the power unit comprising:
a first connector; and
a first attachment mechanism;
a wireless transceiver; and
a front unit configured to detachably couple to the power unit, the front unit comprising:
a second connector configured to couple to and receive power from the first connector;
a second attachment mechanism configured to couple to the first attachment mechanism and engage the power unit and the front unit;
a microphone array located closer to a top end of the front unit than a bottom end of the front unit, the microphone array configured to process an input comprising a command and to generate an audio signal comprising the command;
at least one loudspeaker located closer to the bottom end of the front unit than the top end of the front unit, the at least one loudspeaker configured to output sound; and
an interface configured to receive input, wherein at least a portion of the interface is located between the microphone array and the at least one loudspeaker.

6. The device of claim 5, the front unit further comprising:
one or more processors; and
one or more non-transitory computer readable media storing computer-executable instructions that, when executed by the one or more processors, cause the one or more processors to perform operations comprising:
receiving the audio signal;
sending the audio signal to a remote computing device configured to perform speech processing;
receiving information about an action associated with the input;
receiving information about a second device configured to perform the action; and
causing the second device to perform the action.

7. The device of claim 5, the front unit further comprising:
one or more processors; and
one or more non-transitory computer readable media storing computer-executable instructions that, when executed by the one or more processors, cause the one or more processors to perform operations comprising:
comparing a first word of the audio signal to a wake word stored in a data store;
determining that the first word matches the wake word; and
sending, to the remote computing device, data corresponding to the command, wherein the remote computing device is configured to perform speech processing to identify the action and a second device associated with the action.

8. The device of claim 5, wherein the microphone array comprises a stationary microphone and an adjustable microphone operably coupled to the front unit, the adjustable microphone being configured to pivot from a first position in which the microphone array has a first width, to a second position in which the microphone array has a second width, the second width being greater than the first width.

9. The device of claim 5, wherein the microphone array comprises a stationary microphone and an adjustable microphone, the adjustable microphone being configured to pivot from a first position in which a front surface of the adjustable microphone is offset from a front surface of the front unit, to a second position in which the front surface of the adjustable microphone is substantially aligned with the front surface of the front unit.

10. The device of claim 5, wherein the microphone array comprises one or more adjustable microphones configured to slide or swing on front of the front unit.

11. The device of claim 5, wherein a front panel of the front unit is configured to fit within an opening of a wallplate, the wallplate comprising an off-the-shelf light switch outer casing.

12. The device of claim 5, further comprising a second front unit coupled adjacent to the front unit and comprising at least one of a display screen or a loudspeaker.

13. The device of claim 5, the front unit further comprising a port configured to couple to and power at least one of:
a display;
the at least one loudspeaker;
a camera; or
a motion sensor.

14. The device of claim 5, wherein one of the first connector or the second connector comprises a floating connector that is configured to move independent of a respective unit to which it is coupled in order to align with the other of the first connector or the second connector.

15. The device of claim 5, the power unit further comprising a disconnect switch configured to decouple the power unit from the power source.

16. The device of claim 5, further comprising an input device located further from the top end than the microphone array and further from the bottom end than the at least one loudspeaker.

17. The device of claim 5, further comprising an external device port located further from the top end than the microphone array and further from the bottom end than the at least one loudspeaker.

18. The device of claim 17, wherein the microphone array and the at least one loudspeaker are located on a first side of the front unit and the device port is located on a second side of the front unit.

19. A system comprising:
a power unit;
a wireless transceiver;
a first front unit configured to detachably couple to the power unit, the first front unit comprising:

a microphone array located closer to a top end of the first front unit than a bottom end of the first front unit;

at least one loudspeaker located closer to the bottom end of the first front unit than the to end of the first front unit; and an interface located between the microphone array and the at least one loudspeaker, wherein the first front unit is configured to:
  detachably couple to the power unit;
  receive, using the microphone array, an input corresponding to a command;
  send, via the wireless transceiver, an audio signal comprising the command to a remote computing device configured to perform speech processing;
  receive information about an action and a device associated with the input; and
  send a control signal to the device, the control signal comprising an instruction to perform the action; and
a second front unit positioned adjacent to the first front unit, the second front unit being separate from the first front unit and configured to detachably couple to the power unit.

20. The system of claim 19, wherein the second front unit is coupled to the power unit via an external device port on the first front unit.

21. The system of claim 19, wherein the first front unit is further configured to receive a first set of commands corresponding to a first set of devices, and the second front unit is further configured to:

receive a second set of commands corresponding to a second set of devices;

send data corresponding a first command of the second set of commands to the remote computing device for processing;

receive information about a first action and a first device corresponding to the first command; and send a control signal to the first device, the control signal comprising a first instruction to perform the first action.

22. The system of claim 19, wherein the power unit comprises a first power unit and a second power unit, the first front unit being configured to detachably couple to the first power unit and the second front unit being configured to detachably couple to the second power unit.

23. The system of claim 19, wherein at least one of:

the second front unit further comprises a mechanical switch;

the second front unit further comprises a display; or the microphone array comprises at least one adjustable microphone configured to adjust from a first position to a second position.

24. The system of claim 19, wherein the first front unit comprises a first connector that is configured to move independent of the first front unit in order to align with a second connector on the power unit.

* * * * *